US011223450B2

(12) United States Patent
Yeo et al.

(10) Patent No.: US 11,223,450 B2
(45) Date of Patent: Jan. 11, 2022

(54) METHOD AND APPARATUS FOR DATA TRANSMISSION IN WIRELESS CELLULAR COMMUNICATION SYSTEM

(71) Applicant: Samsung Electronics Co., Ltd., Gyeonggi-do (KR)

(72) Inventors: Jeongho Yeo, Gyeonggi-do (KR); Youngbum Kim, Seoul (KR); Younsun Kim, Gyeonggi-do (KR); Sungjin Park, Incheon (KR); Jinyoung Oh, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/610,363

(22) PCT Filed: May 4, 2018

(86) PCT No.: PCT/KR2018/005184
§ 371 (c)(1),
(2) Date: Nov. 1, 2019

(87) PCT Pub. No.: WO2018/203699
PCT Pub. Date: Nov. 8, 2018

(65) Prior Publication Data
US 2020/0092047 A1 Mar. 19, 2020

(30) Foreign Application Priority Data

May 4, 2017 (KR) .................. 10-2017-0056970
Jun. 15, 2017 (KR) .................. 10-2017-0075684
Sep. 1, 2017 (KR) .................. 10-2017-0111962

(51) Int. Cl.
*H04L 1/18* (2006.01)
*H04L 5/00* (2006.01)
*H04W 72/04* (2009.01)

(52) U.S. Cl.
CPC .......... *H04L 1/1812* (2013.01); *H04L 1/1854* (2013.01); *H04L 1/1861* (2013.01); *H04L 5/0055* (2013.01); *H04W 72/042* (2013.01)

(58) Field of Classification Search
None
See application file for complete search history.

(56) References Cited

U.S. PATENT DOCUMENTS

2009/0313516 A1 12/2009 Shin et al.
2012/0034927 A1* 2/2012 Papasakellariou .... H04W 52/32
455/450

(Continued)

FOREIGN PATENT DOCUMENTS

| KR | 1020180058597 | 6/2018 |
| WO | WO 2016126330 | 8/2016 |
| WO | WO 2017053948 | 3/2017 |

OTHER PUBLICATIONS

PCT/ISA/210 Search Report issued on PCT/KR2018/005184, pp. 5.
PCT/ISA/237 Written Opinion issued on PCT/KR2018/005184, pp. 7.

*Primary Examiner* — Hong Shao
(74) *Attorney, Agent, or Firm* — The Farrell Law Firm, P.C.

(57) ABSTRACT

The present disclosure relates to a communication technique for combining IoT technology with a 5G communication system for supporting a higher data transmission rate than 4G communication systems and to a system therefor. The present disclosure may be applied to intelligent services, such as smart homes, smart buildings, smart cities, smart cars or connected cars, healthcare, digital education, retail businesses, and security-and safety-related services on the basis of 5G communication technology and IoT-related technology. Disclosed are a method and apparatus for retransmitting only the code block, in a transport block, (Continued)

requiring retransmission and not the entire transport block if retransmission of the initially transmitted transport block is necessary.

15 Claims, 20 Drawing Sheets

(56) References Cited

U.S. PATENT DOCUMENTS

| | | |
|---|---|---|
| 2016/0226643 A1 | 8/2016 | Mallik et al. |
| 2016/0233999 A1 | 8/2016 | Chendamarai et al. |
| 2017/0026297 A1 | 1/2017 | Sun et al. |
| 2018/0145797 A1 | 5/2018 | Yeo et al. |
| 2018/0287745 A1* | 10/2018 | Sun .................. H04L 1/1864 |
| 2019/0068318 A1 | 2/2019 | Marinier et al. |
| 2020/0154309 A1* | 5/2020 | Takeda .............. H04W 28/06 |

* cited by examiner

CBG 0: CB 0, CB 1
CBG 1: CB 2, CB 3
CBG 3: CB 4, CB 5

Slot n
(910)

(a)

Slot n
(920)

(b)

METHOD AND APPARATUS FOR DATA TRANSMISSION IN WIRELESS CELLULAR COMMUNICATION SYSTEM

PRIORITY

This application is a National Phase Entry of PCT International Application No. PCT/KR2018/005184 which was filed on May 4, 2018, and claims priority to Korean Patent Application Nos. 10-2017-0056970, 10-2017-0075684 and 10-2017-0111962, which were filed on May 4, 2017, Jun. 15, 2017 and Sep. 1, 2017, respectively, the content of each of which is incorporated herein by reference.

TECHNICAL FIELD

The disclosure relates to a wireless communication system, and more particularly, to a method and apparatus for retransmitting only a code block, of which retransmission is needed, in a transport block, instead of retransmitting the whole transport block, when retransmission of an initially transmitted transport block is needed.

BACKGROUND ART

In order to meet wireless data traffic demands, which have increased since the commercialization of a 4G communication system, efforts to develop an improved 5G communication system or a pre-5G communication system have been made. For this reason, the 5G communication system or the pre-5G communication system is called a beyond-4G-network communication system or a post-LTE system. In order to achieve a high data transmission rate, implementation of the 5G communication system in an ultrahigh-frequency (mmWave) band (e.g., 60 GHz band) is being considered. In the 5G communication system, technologies such as beamforming, massive MIMO, full-dimensional MIMO (FD-MIMO), array antenna, analog beamforming, and large-scale antenna techniques are being discussed in order to mitigate a propagation path loss in the ultrahigh frequency band and increase a propagation transmission distance. Further, in the 5G communication system, technologies such as an evolved small cell, an advanced small cell, a cloud radio access network (cloud RAN), an ultra-dense network, device-to-device communication (D2D), a wireless backhaul, a moving network, cooperative communication, coordinated multi-points (CoMP), and received interference cancellation are being developed to improve the system network. In addition, in the 5G system, advanced coding modulation (ACM) schemes such as hybrid FSK and QAM modulation (FQAM) and sliding window superposition coding (SWSC), and advanced access technologies such as filter bank multi-carrier (FBMC), non-orthogonal multiple access (NOMA), and sparse code multiple access (SCMA) are being developed.

Meanwhile, the Internet has evolved from a human-oriented connection network in which humans generate and consume information to the Internet of Things (IoT), in which distributed components such as objects exchange and process information. Internet-of-Everything (IoE) technology, in which big-data processing technology is combined with IoT technology through connection via a cloud server or the like, has emerged. In order to implement the IoT, technical factors such as a sensing technique, wired/wireless communication, network infrastructure, service-interface technology, and security technology are required, and research on technologies such as a sensor network, machine-to-machine (M2M) communication, machine-type communication (MTC), and the like for connection between objects has recently been conducted. In an IoT environment, through collection and analysis of data generated by connected objects, intelligent Internet technology (IT) service that creates new value in peoples' lives may be provided. The IoT may be applied to fields such as those of a smart home, smart building, smart city, smart car, connected car, smart grid, health care, smart home appliance, or high-tech medical service via the convergence of conventional information technology (IT) and various industries.

Accordingly, various attempts to apply 5G communication to the IoT network are being made. For example, 5G communication technologies such as a sensor network, machine-to-machine (M2M), machine-type communication (MTC) and the like are being implemented using the beamforming scheme, the MIMO scheme, the array antenna scheme, and the like. The application of a cloud RAN as the big data processing technology is an example of convergence of 5G technology and the IoT technology.

In a wireless communication system, particularly the legacy LTE system, data is transmitted in units of transport blocks (TBs). A TB is divided into a plurality of code blocks (CBs), and channel coding is performed in units of CBs. Also, retransmission after initial transmission is performed in units of TBs, and if decoding of only a single CB fails, the whole TB needs to be retransmitted.

DISCLOSURE OF INVENTION

Technical Problem

Therefore, the disclosure has been made in view of the above-mentioned problems, and an aspect of the disclosure is to provide a method and apparatus for performing retransmission in units of CBs or in units of CB groups.

Solution to Problem

In accordance with an aspect of the disclosure, a method of receiving hybrid automatic repeat request-acknowledgement (HARQ-ACK) information in a wireless communication system may include: transmitting, to a user equipment (UE), downlink control information for scheduling downlink data; transmitting the downlink data; and receiving HARQ-ACK information with respect to the downlink data from the UE, wherein the downlink data includes at least one code block group; the HARQ-ACK information includes reception acknowledgement information or reception non-acknowledgement information with respect to each of the at least one code block group, and the HARQ-ACK information is received via a first resource if the HARQ-ACK information indicates that all of the at least one code block group is successfully received by the UE or reception thereof fails, and otherwise, the HARQ-ACK information is received via a second resource.

Also, the method may further include transmitting configuration information indicating the first resource and the second resource to the UE, wherein the HARQ-ACK information received via the first resource includes one bit and the HARQ-ACK information received via the second resource includes more than one bit, and each of at least one code block included in the at least one code block group is mapped to an integer number of symbols.

In accordance with another aspect of the disclosure, a method of transmitting hybrid automatic repeat request-acknowledgement (HARQ-ACK) information in a wireless communication system may include: receiving, from a base station, downlink control information for scheduling downlink data; receiving the downlink data; and transmitting, to the base station, HARQ-ACK information with respect to the downlink data, wherein the downlink data includes at least one code block group, the HARQ-ACK information includes reception acknowledgement information or reception non-acknowledgement information with respect to each of the at least one code block group, and the HARQ-ACK information is transmitted via a first resource if the HARQ-ACK information indicates that all of the at least one code block group is successfully received or reception thereof fails, and otherwise, the HARQ-ACK information is transmitted via a second resource.

In accordance with another aspect of the disclosure, a base station for receiving hybrid automatic repeat request-acknowledgement (HARQ-ACK) information in a wireless communication system may include: a transceiver; and a controller connected to the transceiver, and configured to perform control so as to transmit downlink control information for scheduling downlink data to a user equipment (UE), to transmit the downlink data, and to receive HARQ-ACK information with respect to the downlink data from the UE, wherein the downlink data includes at least one code block group; the HARQ-ACK information includes reception acknowledgement information or reception non-acknowledgement information with respect to each of the at least one code block group; and the HARQ-ACK information is received via a first resource if the HARQ-ACK information indicates that all of the at least one code block group is successfully received by the UE or reception thereof fails, and otherwise, the HARQ-ACK information is received via a second resource.

In accordance with another aspect of the disclosure, a user equipment (UE) that transmits hybrid automatic repeat request-acknowledgement (HARQ_ACK) information in a wireless communication system may include: a transceiver; and a controller connected to the transceiver, and configured to perform control so as to receive downlink control information for scheduling downlink data from a base station, to receive the downlink data, and to transmit HARQ-ACK information with respect to the downlink data to the base station, wherein the downlink data includes at least one code block group; the HARQ-ACK information includes reception acknowledgement information or reception non-acknowledgement information with respect to each of the at least one code block group; and the HARQ-ACK information is transmitted via a first resource if the HARQ-ACK information indicates that all of the at least one code block group is successfully received or reception thereof fails, and otherwise, the HARQ-ACK information is transmitted via a second resource.

Advantageous Effects of Invention

As described above, the disclosure provides an operation method of performing retransmission in units of CBs or CB groups if retransmission is needed in association with transmission of one or two TBs, and thus, a base station and a user equipment (UE) may efficiently perform data transmission, and unnecessary data transmission may be reduced. That is, there is provided a method of retransmitting a part of an initial transmission via partial retransmission, so that a resource required for retransmission may be efficiently used.

MODE FOR THE INVENTION

Figure 1:
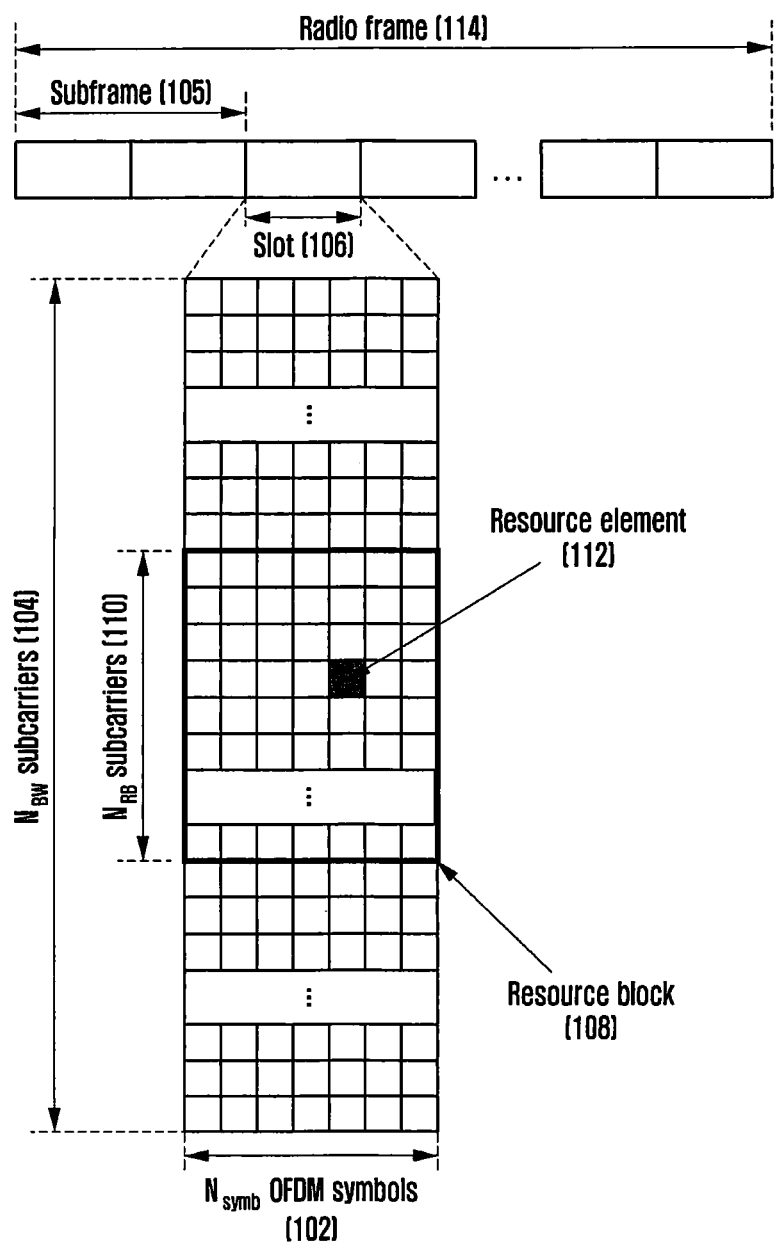
FIG. 1 is a diagram illustrating the basic structure of a time-frequency domain, which is a radio resource area in which data or a control channel is transmitted in a downlink of an LTE system.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification. For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. Also, in an embodiment, the '~ unit' may include one or more processors.

A wireless communication system has developed beyond the voice-based service provided at initial stages into a broadband wireless communication system that provides high-speed and high-quality packet data service according to communication standards such as high-speed packet access (HSPA) of 3GPP, long-term evolution (LTE) or evolved universal terrestrial radio access (E-UTRA), LTE-advanced (LTE-A), high-rate packet data (HRPD) of 3GPP2, ultra-mobile broadband (UMB), and 802.16e of IEEE, and the like. Also, the communication standard of 5G or new radio (NR) is being developed as a 5G wireless communication system.

An LTE system, which is a representative example of a broadband wireless communication system, employs an orthogonal frequency division multiplexing (OFDM) scheme for a downlink (DL), and employs a single carrier frequency division multiple access (SC-FDMA) scheme for an uplink (UL). An uplink is a radio link in which a user equipment (UE) (which includes a user equipment (UE), a mobile station (MS), a cellular phone, a smartphone, or a computer or multimedia system capable of performing a communication function) transmits data or a control signal to a base station (which is one of an eNode B or base station (BS), a radio access unit, a base station controller, or a node on a network), and a downlink is a radio link in which a base station transmits data or a control signal to a UE. In the multiple access schemes noted above, time-frequency resources used to deliver data or control information are allocated and operated in a manner to prevent overlapping of the resources, that is, to establish orthogonality between users so as to identify data or control information of each user.

When decoding fails upon initial transmission, the LTE system employs hybrid automatic repeat request (HARQ), which retransmits the corresponding data in a physical layer. The HARQ scheme is a scheme that enables a receiver to transmit, to a transmitter, information (negative acknowledgement (NACK)) indicating failure of decoding when the receiver does not successfully decode data, so that the transmitter retransmits the corresponding data in a physical layer. The receiver may combine data retransmitted from the transmitter and the previous data, decoding of which failed, whereby data reception performance may increase. Also, if the receiver accurately decodes data, the receiver transmits information (ACK) reporting that decoding is successfully executed, so that the transmitter transmits new data.

FIG. 1 is a diagram illustrating the basic structure of a time-frequency domain, which is a radio resource area in which data or a control channel is transmitted in a downlink of an LTE system.

In FIG. 1, the horizontal axis indicates a time domain and the vertical axis indicates a frequency domain. In the time domain, the minimum transmission unit is an OFDM symbol. One slot 106 includes $N_{symb}$ OFDM symbols 1-02, and one subframe 105 includes two slots. The length of one slot is 0.5 ms, and the length of one subframe is 1.0 ms. A radio frame 114 is a time domain unit including 10 subframes. In the frequency domain, the minimum transmission unit is a subcarrier. The entire system transmission bandwidth includes a total of $N_{BW}$ subcarriers 104.

In the time-frequency domain, a basic resource unit is a resource element (RE) 112, and an RE is expressed by an OFDM symbol index and a subcarrier index. A resource block (RB) (or a physical resource block (PRB)) 108 is defined by $N_{symb}$ consecutive OFDM symbols 102 in the time domain and $N_{RB}$ consecutive subcarriers 110 in the frequency domain. Therefore, one RB 108 includes $N_{symb} \times N_{RB}$ REs 112. Generally, the minimum transport unit of data is an RB. In the LTE system, generally, $N_{symb}=7$ and $N_{RB}=12$, and may be proportional to the bandwidth $N_{BW}$ of a LTE transmission band. In a system different from an LTE system, another value may be used.

The data rate may increase in proportion to the number of RBs scheduled for a UE. In the LTE system, six transmission bandwidths are defined and used. In the case of a frequency-division-duplex (FDD) system, which operates a downlink and uplink based on frequencies, the bandwidth of downlink transmission and the bandwidth of uplink transmission may be different from each other. A channel bandwidth may indicate a radio-frequency (RF) bandwidth corresponding to a system transmission bandwidth. Table 1 indicates the relationship between a system transmission bandwidth and a channel bandwidth as defined in the LTE system. For example, when an LTE system has a channel bandwidth of 10 MHz, the transmission bandwidth may include 50 RBs.

TABLE 1

| Channel bandwidth $BW_{channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Downlink control information may be transmitted within the first N OFDM symbols included in a subframe. In the embodiment, generally, N={1, 2, 3}. Therefore, N applied to each subframe may vary depending on the amount of control information to be transmitted in the current subframe. The transmitted control information may include a control channel transmission interval indicator indicating how many OFDM symbols are used when the control information is transmitted, scheduling information associated with downlink data or uplink data, and information associated with a HARQ ACK/NACK.

In the LTE system, scheduling information associated with downlink data or uplink data may be transmitted from a base station to a UE via downlink control information (DCI). DCI is defined according to various formats. Depending on each format, the DCI indicates whether scheduling information is scheduling information (UL grant) for uplink data or scheduling information (DL grant) for downlink data, whether the size of control information is small compact DCI, whether spatial multiplexing using multiple antennas is applied, whether DCI is for the purpose of power control, or the like. For example, DCI format 1, which is the scheduling control information (DL grant) for downlink data, may include at least one of the following pieces of control information.

Resource allocation type 0/1 flag: indicates whether a resource allocation scheme is type 0 or type 1. Type 0 applies a bitmap scheme and allocates resources in units of resource block groups (RBGs). In the LTE system, a basic scheduling unit is a resource block (RB), expressed by time and frequency domain resources, and an RBG includes a plurality of RBs and is used as a basic scheduling unit in the type 0 scheme. Type 1 allows allocation of a predetermined RB in an RBG.

Resource block assignment: indicates an RB allocated for data transmission. An expressed resource is determined according to the system bandwidth and the resource allocation scheme.

Modulation and coding scheme (MCS): indicates a modulation scheme used for data transmission and the size of a transport block (TB), which is the data to be transmitted.

HARQ process number: indicates the process number of HARQ.

New data indicator: indicates HARQ initial transmission or retransmission.

Redundancy version: indicates the redundancy version of HARQ.

Transmit power control (TPC) command for physical uplink control channel (PUCCH): indicates a transmission power control command for a PUCCH, which is an uplink control channel.

The DCI may pass through a channel coding and modulation process, and may be transmitted via a physical downlink control channel (PDCCH) or an enhanced PDCCH (EPDCCH), which is a downlink physical control channel. Hereinafter, PDCCH or EPDCCH transmission or reception may be interchangeably used with downlink control information transmission or reception via a PDCCH or EPDCCH. In the same manner, PDSCH transmission or reception may be interchangeably used with downlink data transmission or reception via a PDSCH. The technology may be applicable to other control information and data and channels.

Generally, the DCI is scrambled with a predetermined radio network temporary identifier (RNTI) (or a UE identifier), independently for each UE, a cyclic redundancy check (CRC) bit is added, and channel coding is performed, whereby each independent PDCCH is configured and transmitted. In the time domain, a PDCCH is mapped and transmitted during the control channel transmission interval. The location at which a PDCCH is mapped in the frequency domain may be determined based on the identifier (ID) of each UE, and may be transmitted over the entire system transmission band.

Downlink data may be transmitted via a physical downlink shared channel, which is a physical channel for downlink data transmission. The PDSCH may be transmitted after the control channel transmission interval. The scheduling information, such as a detailed mapping location in the frequency domain, a modulation scheme, and the like, may be determined based on the DCI transmitted via the PDCCH.

Via an MCS in the control information included in the DCI, a base station may report the modulation scheme applied to the PDSCH to be transmitted to a UE and the size (transport block size (TBS)) of data to be transmitted. In the embodiment, the MCS may include 5 bits, or may include more or fewer bits than 5 bits. The TBS corresponds to the size of data (transport block (TB)) that the base station desires to transmit before channel coding for error correction is applied to the data.

In the disclosure, a TB may include a medium access control (MAC) header, a MAC control element (CE), one or more MAC service data units (SDU), and padding bits. Alternatively, the TB may indicate a unit of data or a MAC protocol data unit (PDU) that is delivered from a MAC layer to a physical layer.

The modulation schemes supported by the LTE system include quadrature phase shift keying (QPSK), 16 quadrature amplitude modulation (16QAM), and 64QAM. Modulation orders ($Q_m$) thereof correspond to 2, 4, and 6, respectively. That is, in the case of QPSK modulation, 2 bits are transmitted per symbol. In the case of 16QAM modulation, 4 bits are transmitted per symbol. In the case of 64QAM modulation, 6 bits are transmitted per symbol. Also, a modulation scheme beyond 256QAM may be used according to a change of a system.

Figure 2:
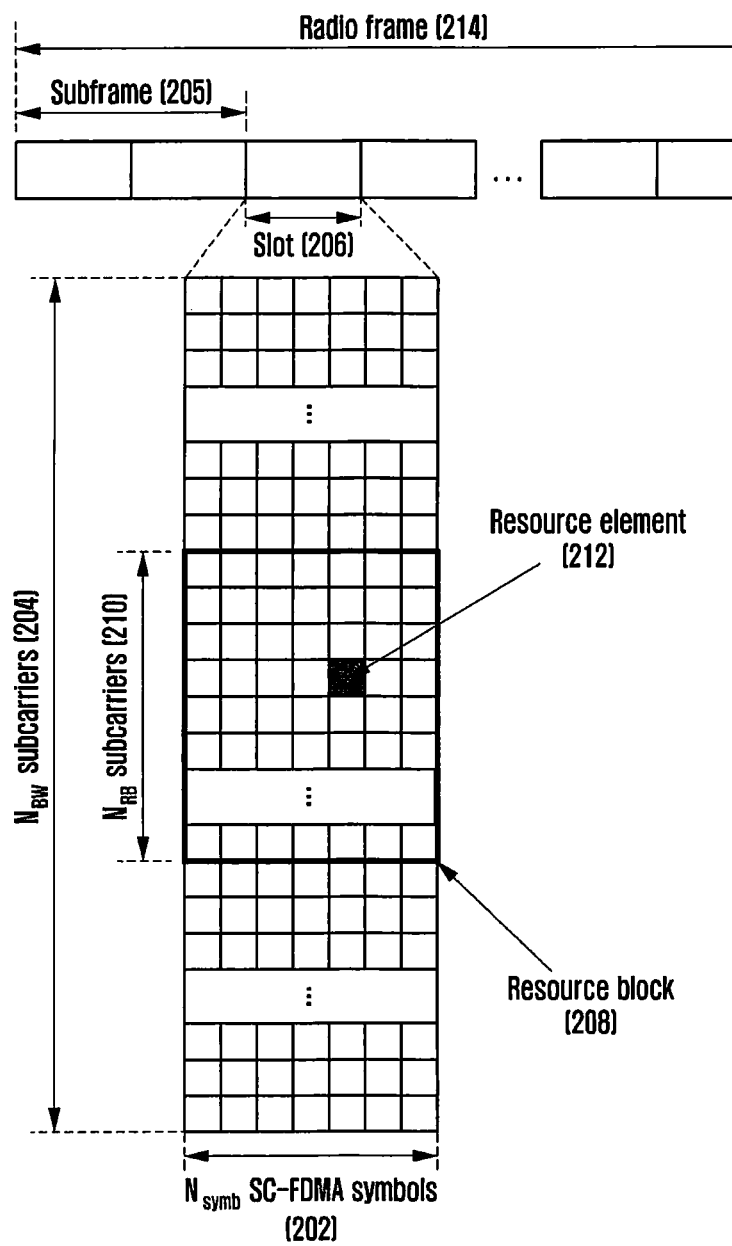
FIG. 2 is a diagram illustrating the basic structure of a time-frequency domain, which is a radio resource area in which data or a control channel is transmitted in an uplink of an LTE system.

FIG. 2 is a diagram illustrating the basic structure of a time-frequency domain, which is a radio resource area in which data or a control channel is transmitted in an uplink of an LTE system.

In FIG. 2, the horizontal axis indicates the time domain and the vertical axis indicates the frequency domain. The minimum transmission unit in the time domain is an SC-FDMA symbol 202, and a single slot 206 may include $N_{symb}$ SC-FDMA symbols. A single subframe 205 includes two slots. The minimum transmission unit in the frequency domain is a subcarrier, and the entire system transmission bandwidth 204 includes a total of $N_{BW}$ subcarriers. $N_{BW}$ may have a value that is proportional to a system transmission band.

In the time-frequency domain, a basic resource unit is a resource element 212, and an RE is expressed by an SC-FDMA symbol index and a subcarrier index. A resource block 208 may be defined as $N_{symb}$ consecutive SC-FDMA symbols in the time domain and $N_{RB}$ consecutive subcarriers in the frequency domain. Therefore, a single RB includes $N_{symb} \times N_{RB}$ REs. In general, the minimum transmission unit of data or control information is an RB. A PUCCH is mapped to a frequency domain corresponding to 1 RB, and may be transmitted during one subframe.

In the LTE system, the timing relationship of a PUCCH or a PUSCH may be defined, the PUCCH or PUSCH being an uplink physical channel which delivers a HARQ ACK/NACK in response to a PDCCH or EPDCCH including a semi-persistent scheduling release (SPS release) or a PDSCH, which is a downlink data transmission physical channel. For example, in the LTE system, which operates based on FDD, a HARQ ACK/NACK, which is associated with a PDSCH or a PDCCH or EPDCCH including SPS release transmitted in an n-4$^{th}$ subframe, is transmitted in an n$^{th}$ subframe via a PUCCH or PUSCH.

In the LTE system, a downlink HARQ adapts an asynchronous HARQ scheme, in which a point in time for data retransmission is not fixed. That is, when a base station receives a HARQ NACK from a UE as feedback for initially transmitted data that the base station transmits, the base station freely determines a point in time for transmission of data to be retransmitted via a scheduling operation. For the HARQ operation, the UE performs buffering of data which is identified as having an error according to the result of decoding the received data, and may combine the buffered data and the data to be retransmitted.

When the UE receives a PDSCH including downlink data transmitted from the base station in subframe n, the UE transmits uplink control information including a HARQ ACK or NACK with respect to the downlink data via a PUCCH or a PUSCH in subframe n+k. In this instance, k is defined differently according to whether the LTE system adopts FDD or time-division duplex (TDD) and the corresponding subframe configuration. For example, in the case of an FDD LTE system, k is fixed to 4. In the case of a TDD LTE system, k may change according to a subframe configuration and a subframe number.

In the LTE system, unlike downlink HARQ, uplink HARQ adapts a synchronous HARQ scheme in which a point in time for data transmission is fixed. That is, the uplink/downlink timing relation of a physical uplink shared channel (PUSCH), which is a physical channel for uplink data transmission, a PDCCH, which is a downlink control channel preceding the PUSCH, and a physical hybrid indicator channel (PHICH), which is a physical channel for transmission of a downlink HARQ ACK/NACK corresponding to the PUSCH, is fixed by the rule as follows.

When receiving a PHICH that delivers a downlink HARQ ACK/NACK or a PDCCH including uplink scheduling control information transmitted from a base station in subframe n, a UE transmits uplink data corresponding to the control information via a PUSCH in subframe n+k. In this instance, k is defined differently depending on whether the LTE system adopts FDD or TDD and the configuration thereof. For example, in the case of an FDD LTE system, k is fixed to 4. In the case of a TDD LTE system, k may be changed according to a subframe configuration and a subframe number.

In the FDD LTE system, if a base station transmits an uplink scheduling grant or a downlink control signal and data to a UE in subframe n, the UE receives the uplink scheduling grant or the downlink control signal and data in subframe n. If the UE receives the uplink scheduling grant in subframe n, the UE may transmit uplink data in subframe n+4. If the UE receives the downlink control signal and data in subframe n, the UE may transmit a HARQ ACK or NACK with respect to the downlink data in subframe n+4. Therefore, the period of time that the UE is capable of spending on preparation in order to transmit uplink data upon reception of the uplink scheduling grant, or in order to transfer the HARQ ACK or NACK upon reception of the downlink data, may be 3 ms, which corresponds to three subframes.

Further, when the UE receives a PHICH that delivers a downlink HARQ ACK/NACK from the base station in subframe i, the PHICH corresponds to a PUSCH that the UE transmits in subframe i-k. In this instance, k is defined differently depending on whether the LTE system adopts FDD or TDD and the configuration thereof. For example, in the case of an FDD LTE system, k is fixed to 4. In the case of a TDD LTE system, k may be changed according to a subframe configuration and a subframe number.

New radio (NR) access technology, which is a new 5G communication technology, is designed to enable various services to be freely multiplexed in time and frequency resources. Accordingly, a waveform, a numerology, a reference signal, or the like may be dynamically or freely allocated according to a corresponding service's need. In order to provide optimal service to a UE in wireless communication, it is important to optimize data transmission by measuring the quality of a channel and interference. Accordingly, accurate measurement of a channel state is essential. However, unlike 4G communication, in which channel and interference characteristics do not significantly change according to a frequency resource, in the case of a 5G channel, channel and interference characteristics change significantly depending on the service. Accordingly, a subset needs to be supported from the perspective of a frequency resource group (FRG), so as to separately measure the channel and interference characteristics.

The types of services supported in the NR system may be categorized into enhanced mobile broadband (eMBB), massive machine-type communications (mMTC), ultra-reliable and low-latency communications (URLLC), and the like. eMBB is a service for high-speed transmission of large-capacity data. mMTC is a service for UE power minimization and multi-UE access. URLLC is a service for high reliability and low latency. Different requirements may be applied depending on the type of service applied to a UE.

Figure 3:
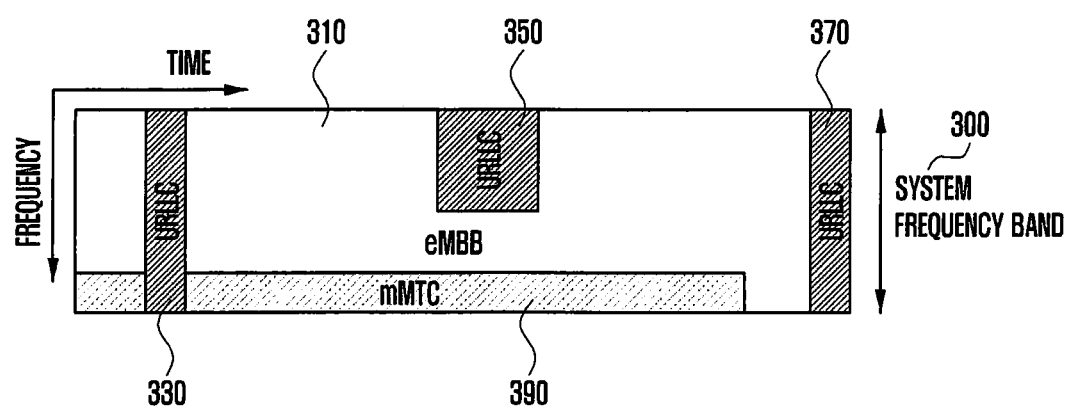
FIGS. 3 and 4 are diagrams illustrating allocation of data for eMBB, URLLC, and mMTC, which are services under consideration for implementation in 5G or NR systems, in frequency-time resources.
Figure 4:
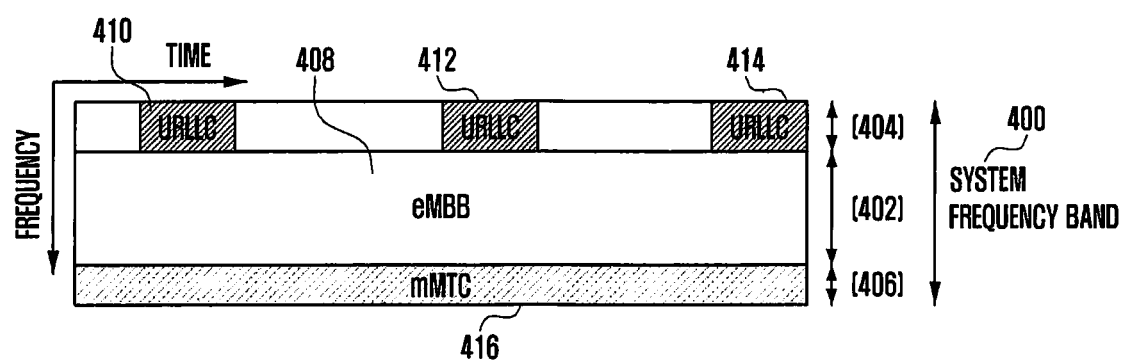

FIGS. 3 and 4 are diagrams illustrating allocation of data for eMBB, URLLC, and mMTC, which are services under consideration for implementation in 5G or NR system, in frequency-time resources. Referring to FIGS. 3 and 4, there is provided a scheme of allocating frequency and time resources for transmitting information in each system.

FIG. 3 illustrates that data for eMBB, URLLC, mMTC have been allocated across the entire system frequency band 300. If URLLC data 330, 350, and 370 is generated and needs to be transmitted, while eMBB 310 and mMTC data 390 are allocated and transmitted in a predetermined frequency band, a transmitter may empty the part in which eMBB 310 and mMTC data 390 are previously allocated or may not perform transmission thereof, and may transmit the URLLC data 350, 350, and 370. Among the services, URLLC needs low latency, and thus, the URLLC data may be allocated to a part of the resource 310 where eMBB is allocated, and may be transmitted. If URLLC data is additionally allocated and transmitted in a resource to which eMBB has been allocated, eMBB data may not be transmitted in the overlapping frequency-time resources. Accordingly, the performance of transmission of the eMBB data may be decreased. In this instance, transmission of the eMBB data may fail due to the allocation of URLLC.

In FIG. 4, the entire system frequency band 400 may be divided into sub-bands 402, 404, and 406, and each sub-band may be used for transmitting a service and data. Information related to configuration of the sub-bands may be determined in advance, and the information may be transmitted from a base station to a UE via higher signaling. Alternatively, a base station or a network node may arbitrarily determine the sub-bands and provide services without separately transmitting sub-band configuration information to a UE. FIG. 4 illustrates that the sub-band 402 is used for transmission of eMBB data, the sub-band 404 is used for transmission of URLLC data, and the sub-band 406 is used for transmission of mMTC data.

In embodiments of the disclosure, the length of a transmission time interval (TTI) used for URLLC transmission may be shorter than the length of a TTI used for eMBB or mMTC transmission. Also, a response to information related to URLLC may be transmitted earlier than that of eMBB or mMTC, and thus information may be transmitted or received with low latency.

Figure 5:
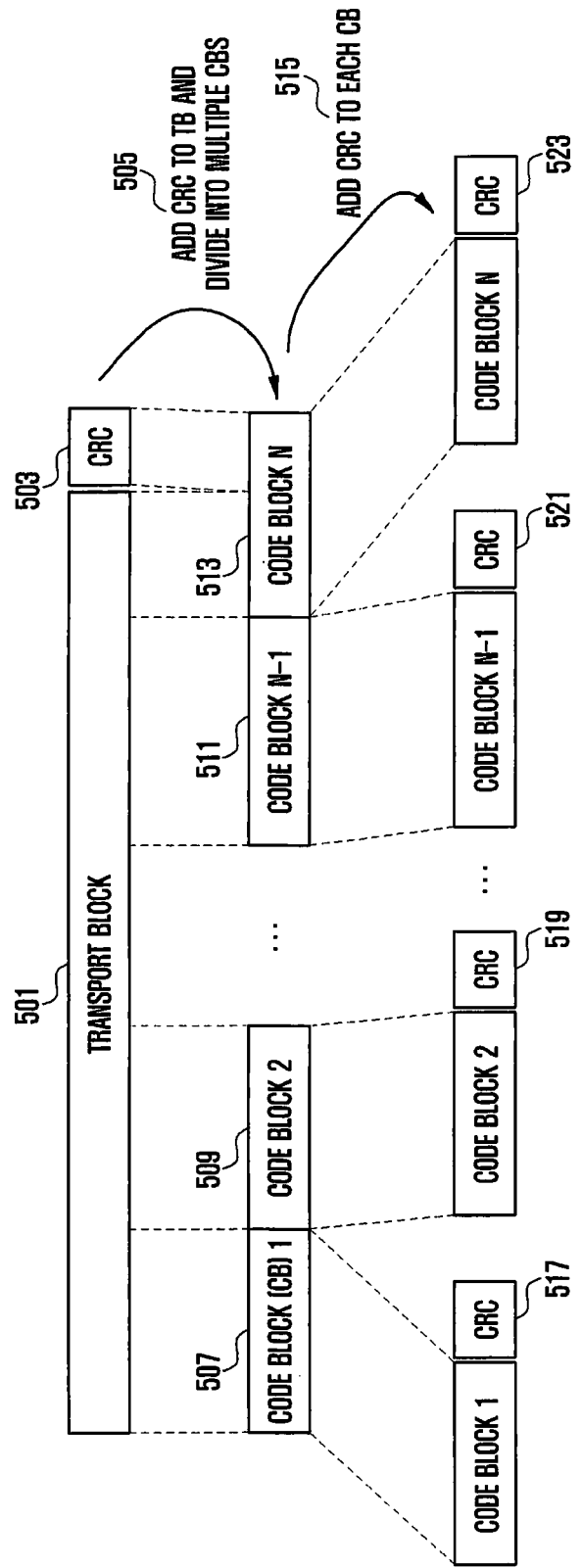
FIG. 5 is a diagram illustrating a process in which a single transport block is divided into multiple code blocks and CRCs are added.

FIG. 5 is a diagram illustrating a process in which a single transport block is divided into multiple code blocks and CRCs are added.

Referring to FIG. 5, a CRC 503 may be added to the end or the front part of a single transport block 501 to be transmitted in an uplink or a downlink. The CRC may have 16 bits, 24 bits, or a predetermined number of bits, or may have bits, the number of which is variable depending on a channel condition or the like. The CRC may be used for determining whether channel coding is successfully performed. A block including the TB 501 and the CRC 503 may be divided into multiple code blocks (CB) 507, 509, 511, and 513, in operation 505. The code block may be obtained by division based on a predetermined maximum size. In this instance, the last code block 513 may be smaller than other code blocks, or may be adjusted to have the same length as other blocks by including 0, a random value, or 1.

CRCs 517, 519, 521, and 523 may be added to respective code blocks in operation 515. The CRC may have 16 bits, 24 bits, or a predetermined number of bits, and may be used for determining whether channel coding is successfully performed. However the CRC 503 added to the TB and the CRCs 517, 519, 521, and 523 added to the code blocks may be omitted depending on the channel code type of a channel code to be applied to a code block. For example, if a low-density parity-check code, instead of a turbo code, is applied to a code block, CRCs 517, 519, 521, and 523, to be inserted into respective code blocks, may be omitted. However, even though an LDPC code is applied to a code block, the CRCs 517, 519, 521, and 523 may be added to code blocks. If a polar code is used, a CRC may be added, or may be omitted.

Figure 6:
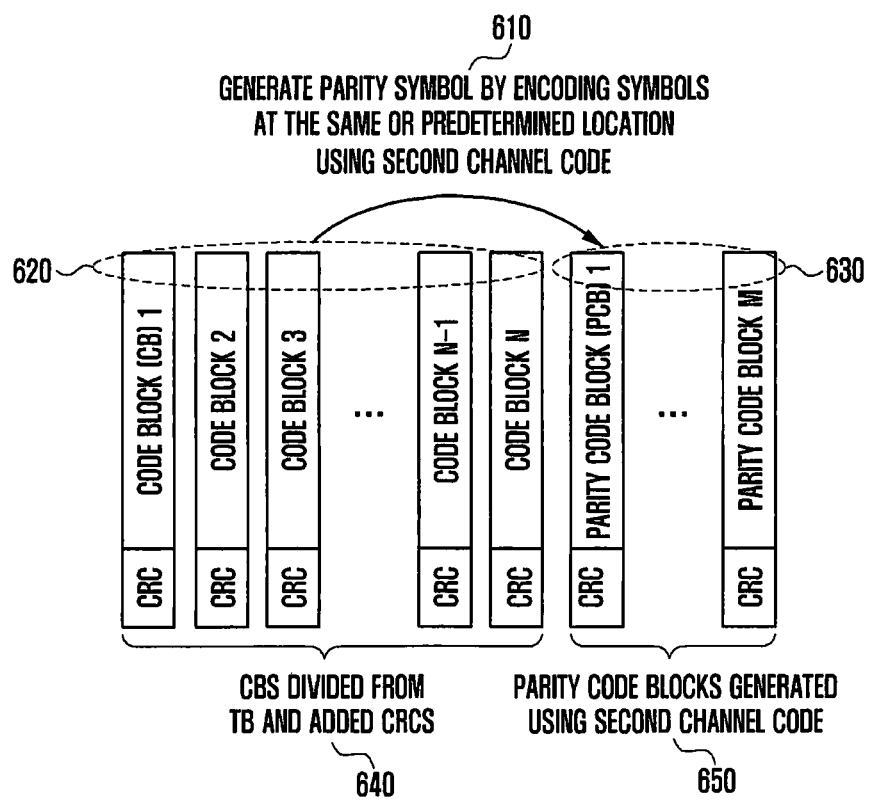
FIG. 6 is a diagram illustrating a scheme of transmitting a signal using an outer code.
Figure 7:
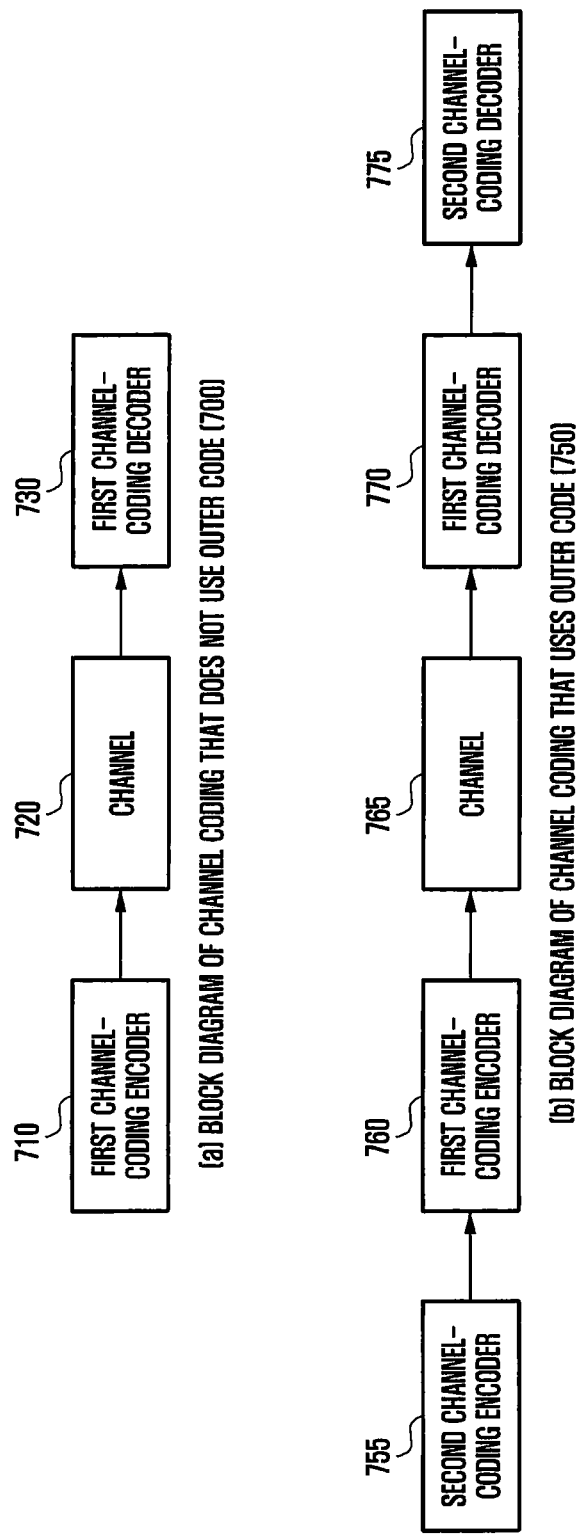
FIG. 7 is a block diagram illustrating the structure of a communication system that uses an outer code.

FIG. 6 is a diagram illustrating a scheme of transmitting a signal using an outer code. FIG. 7 is a block diagram illustrating the structure of a communication system that uses an outer code.

Referring to FIGS. 6 and 7, a method of transmitting a signal using an outer code will be described.

Referring to FIG. 6, a single transport block is divided into multiple code blocks, bits or symbols 620 existing in the same location of the respective code blocks are encoded using a second channel code, and parity bits or symbols 630 may be generated in operation 610. Subsequently, CRCs may be added to respective parity code blocks, which are generated by second channel code encoding of the respective code blocks in operations 640 and 650. Whether to add a CRC may be changed depending on the type of a first channel code that is used. For example, if a turbo code is used as the first channel code, the CRCs are added in operations 640 and 650. Subsequently, each code block and parity code block may be encoded using the first channel code.

The transport block is a single TB transferred from a higher layer to a physical layer, and the TB in the physical layer may be regarded as data. First, a CRC is added to the TB. In order to generate the CRC, a TB data bit and a cyclic generator polynomial may be used. The cyclic generator polynomial may be defined by various methods. For example, if it is assumed that the cyclic generator polynomial for a 24-bit CRC is $g_{CRC24A}(D)=D^{24}+D^{23}+D^{18}+D^{17}+D^{14}+D^{11}+D^{10}+D^7+D^6+D^5+D^4+D^3+D+1$, and L=24, CRC $p_0, p_1, p_2, p_3, \ldots, p_{L-1}$ with respect to TB data $a_0, a_1, a_2, a_3, \ldots, a_{A-1}$ may determine values which enable a remainder to be 0 when $a_0D^{A+23}\pm a_1D^{A+22}+ \ldots +a_{A-1}D^{24}+p_0D^{23}+p_1D^{22}+ \ldots +p_{22}D^1+p_{23}$ is divided by $g_{CRC24A}(D)$, as $p_0, p_1, p_2, p_3, \ldots, p_{L-1}$. The example in which the length of the CRC is 24 has been described. Various lengths may be used, such as 12, 16, 24, 32, 40, 48, 64, and the like. A CRC is added to each CB. The cyclic generator polynomial used for the CRC of a CB may be different from that of the CRC of a TB.

In a legacy LTE system, when retransmission is performed after initial data transmission because the initial transmission fails, an initially transmitted TB may be transmitted again. Unlike the above, retransmission based on a CB or multiple CBs, instead of a TB, may be allowed. To this end, a multi-bit HARQ-ACK feedback for each TB may need to be transmitted from a UE. Also, in the retransmission, control information for scheduling, transmitted from a base station, provides information indicating a part corresponding to retransmission.

Referring to FIG. 7, in the case 750 in which an outer code is used, data to be transmitted may pass through a second channel-coding encoder 755. As a channel code used for the second channel coding, for example, a Reed-Solomon code, a BCH code, a raptor code, a parity bit generator code, and the like may be used. Bits or symbols that pass through the second channel-coding encoder 755 may pass through a first channel-coding encoder 760. As a channel code used for the first channel coding, a convolutional code, an LDPC code, a turbo code, a polar code, and the like may be used. Channel-coded symbols may pass through a channel 765 and be received by a receiver. The receiver may sequentially operate a first channel-coding decoder 770 and a second channel-coding decoder 775 based on the received signal. The first channel-coding decoder 770 and the second channel-coding decoder 775 may perform operations respectively corresponding to the first channel-coding encoder 770 and the second channel-coding encoder 775.

In the case 700 in which an outer code is not used, only a first channel-coding encoder 700 and first channel-coding decoder 720 may be used in a transceiver, and a second channel-coding encoder and a second channel-coding decoder are not used. Even in the case in which an outer code is not used, the first channel-coding encoder 700 and the first channel-coding decoder 720 may be configured to be the same as the case in which an outer code is used.

In order to describe the method and apparatus proposed in the embodiments, the terms "physical channel" and "signal" used to describe the legacy LTE or LTE-A system may be used. However, the disclosure may be applicable to a wireless communication system different from the LTE and LTE-A system.

Figure 8A:
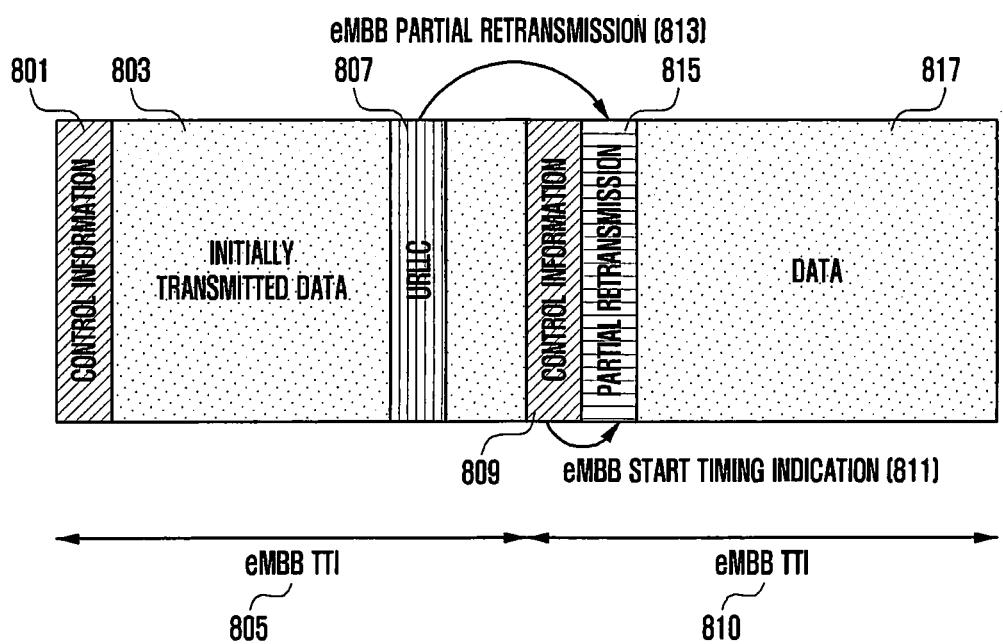
FIG. 8A is a diagram illustrating an example of a partial retransmission.

FIG. 8A is a diagram illustrating an example of partial retransmission. A base station schedules eMBB data 803 for a first UE using a control signal 801, and the base station may transmit other data 807 to the first UE or a second UE using a part 807 of the resource to which the eMBB data is to be mapped when the eMBB data 803 is transmitted. Subsequently, the base station may retransmit a part 815 of the eMBB data which has been transmitted to the first UE, or which has not been transmitted, in a subsequent TTI 810. The part of data is retransmitted based on a CB or a CB group including one or more CBs.

The eMBB control signal 801 transfers scheduling information associated with the eMBB data 803 to be transmitted to the first UE. If URLLC data is generated while the eMBB data 803 is transmitted, the base station transmits a URLL control signal and data to the second UE in operation 807. The transmission of the URLLC control signal and data may be performed by mapping the URLLC control signal and data 807 without mapping a part of the previously scheduled eMBB data 803. Therefore, the part of the eMBB data is not transmitted in a TTI 805. Accordingly, an eMBB UE that receives the same may fail to decode the eMBB data.

To complement the above, the part of the eMBB data which is not transmitted in the TTI 805, during which the initial transmission is performed, may be transmitted in the TTI 810 in operation 813. The partial transmission is performed in the TTI 810, which is after the initial transmission, and may be performed without receiving HARQ-ACK information with respect to the initial transmission from a UE. Scheduling information for partial retransmission may be transferred in a control signal area 809 of the subsequent TTI in order to perform the partial transmission.

Also, when the eMBB or other data 817 is transmitted to another UE in the control signal area 809 of the subsequent TTI 810, a control signal may include information 811 associated with the location of the symbol at which resource mapping of the eMBB or other data 817 starts. The information may be transferred via some bits of downlink control information (DCI) transmitted in the control signal area 809. The partial transmission 815 associated with the previous initial transmission is performed at a predetermined symbol using the information associated with the location of the symbol at which resource mapping of the eMBB or other data 817 starts. Also, the eMBB control signal 801 and 809 of FIG. 8 may be transferred only in a partial area, as opposed to the entire displayed area. Also, the control signal 801 and 809 may be transferred only in a partial frequency band, as opposed to the entire frequency band.

Although the above example describes that a part of eMBB data is not transmitted for the transmission of URLLC data 807 and that retransmission 815 of the part of the eMBB data is performed in a subsequent TTI, the example may be used when a base station arbitrarily retransmits a predetermined part of data, in addition to the URLLC data transmission.

Also, the retransmission 815 of the part may be identified as initial transmission of the corresponding part. That is, the UE that receives the partial retransmission 815 in the subsequent TTI 810 may perform separate decoding using only data corresponding to the partial retransmission 815 in the subsequent TTI 810, as opposed to combining the partial retransmission and the data received in the previous TTI 805, and perform HARQ decoding. Although the example describes the case in which a first symbol starts to be used for retransmission after a control signal in the TTI 810 after initial transmission, the location of a symbol used for retransmission may be variable. Also, although the example has been described based on downlink transmission, the example may be easily modified and applied to uplink transmission.

Figure 8B:
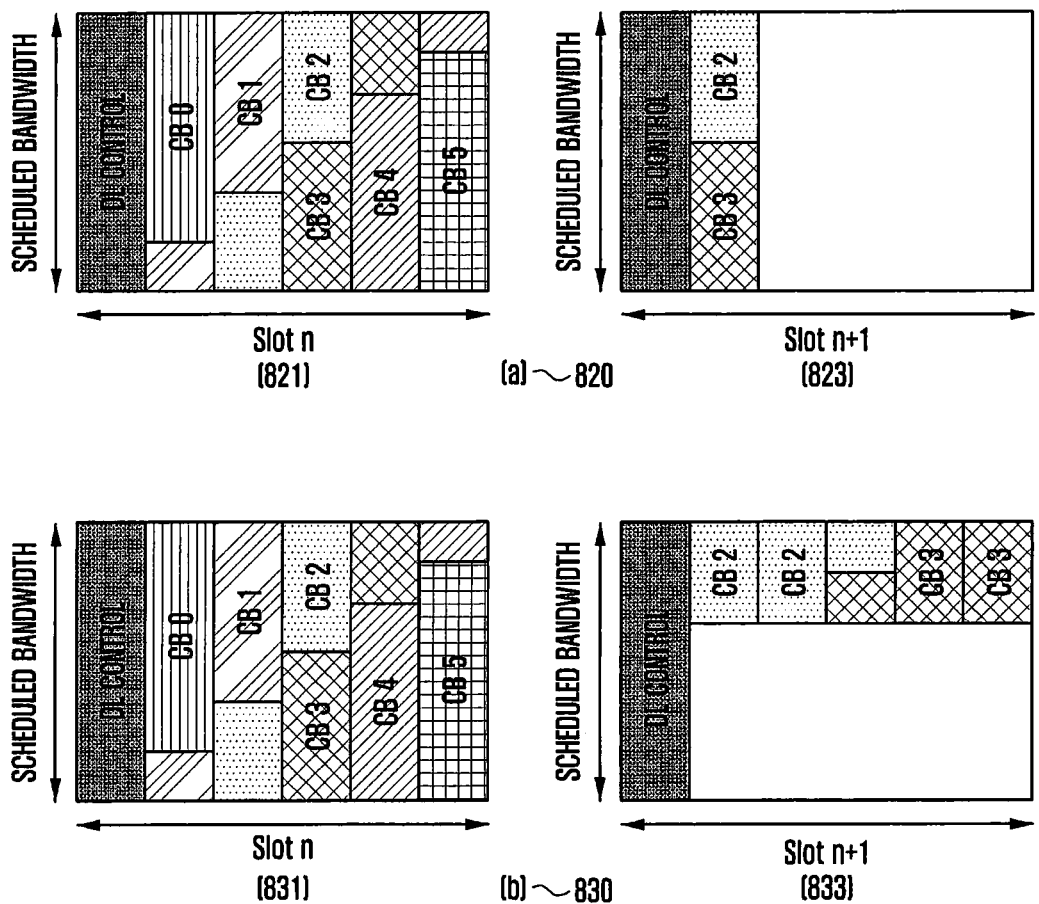
FIG. 8B is a diagram illustrating an example of retransmitting some of the initially transmitted code blocks.

FIG. 8B is a diagram illustrating an example of retransmitting some of the initially transmitted code blocks. Particularly, diagrams in FIG. 8B may show examples in which CB2 and CB3 are retransmitted among six CBs which are initially transmitted. Diagram 820 shows the case in which retransmission is performed using the entire bandwidth, which is the same as the bandwidth of a previously scheduled transmission resource, and using some of the symbols excluding a control area of a slot in which retransmission is performed. Diagram 830 shows the case in which retransmission is performed using a bandwidth smaller than the bandwidth of a previously scheduled transmission resource, and using all of the symbols excluding a control area of a slot in which retransmission is performed. As described above, in an NR system, a method of retransmitting only some CBs or some CB groups (CBG) of an initially transmitted TB may be applied.

In the disclosure, the operation of a base station and a UE in association with the above-described method of retransmission based on a CBG will be described. In the disclosure, a CB group-based retransmission, a CBG-based retransmission, partial retransmission, CBG retransmission, and the like may be interchangeably used.

In the disclosure, a transmission time interval (TTI) may indicate a unit of transmitting a control signal and a data signal, or may indicate a unit of transmitting a data signal. For example, a transmission time interval in a downlink in the legacy LTE system is a subframe, which is a time unit of 1 ms. In the disclosure, a transmission time interval in an uplink may indicate a unit of transmitting a control signal or a data signal, or may indicate a unit of transmitting a data signal. A transmission time interval in an uplink in the legacy LTE is a subframe, which is a time unit of 1 ms, the same as that of the downlink. Conversely, in the NR system, a TTI for data transmission may be a slot or a mini-slot.

In the disclosure, the terms "physical channel" and "signal", which are conventionally used, may be interchangeably used with "data" or "control signal". For example, although a PDSCH is a physical channel that delivers data, a PDSCH may be considered as data in the disclosure.

In the disclosure, unless a TDD system is mentioned, descriptions will be provided with reference to a FDD system. However, a method and an apparatus of the disclosure in the FDD system may be applicable to the TDD system via simple modification.

Hereinafter, higher signaling is signal transfer from a base station to a UE via a downlink data channel of a physical layer or signal transfer from a UE to a base station via an uplink data channel of a physical layer, which may be referred to as RRC signaling or a MAC control element.

<First Embodiment>

The first embodiment provides a code block group interleaver that changes a mapping order in a code block group, in the case of CB group-based retransmission, in order to decrease the possibility of failure of decoding of an existing mapped-code block group when data such as URLLC is transmitted by being overwritten on existing mapped data or by puncturing existing data.

Hereinafter, a method of performing interleaving of CBs in a single CBG in the CBG-based retransmission will be described with reference to FIGS. 9, 10, and 11. Here, interleaving among CBs may indicate shuffling the order of the bits of CBs.

Figure 9:
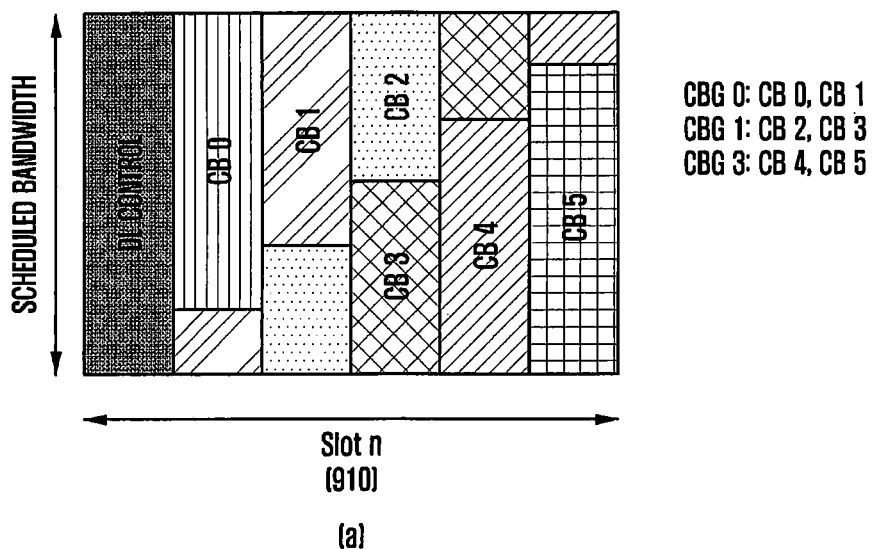
FIG. 9 is a diagram illustrating an order of mapping CBs in a CBG.
Figure 9:
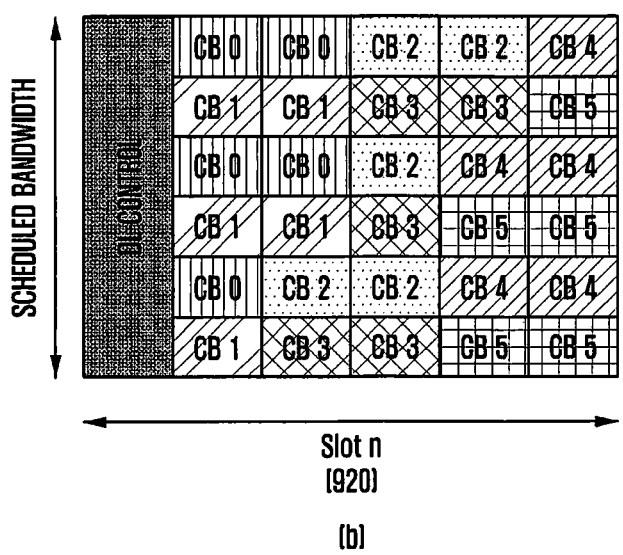

FIG. 9 is a diagram illustrating the order of mapping CBs in a CBG. The number of CBs in a $k^{th}$ CBG is indicated by $N_{CB}^{CBG_k}$ or N_{CB}^{CBG_k}. Diagram 910 illustrates a method of sequentially mapping CBs in a CBG. Diagram 920 illustrates a method of shuffling and mapping the bits of the CBs in a CBG. If a part of the resource in the CBG is punctured or is not transmitted due to the transmission of URLLC or the like, performance deterioration may occur due to puncturing or partial omission of transmission. The method of diagram 920 may reduce the performance deterioration compared to the method of diagram 910.

For example, the method of shuffling the bits of the CBs in the CBG may be performed as follows. It is assumed that the number of CBs in a $k^{th}$ CBG is $k_{CB}^{CBG_k}$ and that the total number of bits of $N_{CB}^{CBG_k}$ CBs is G. If an $m^{th}$ bit in the CBG after channel coding is $y_m$, a CBG interleaver provided in the disclosure may perform a function of changing $y_m$ to $b_i$. Using G bits from $y_0$ to $y_{G-1}$ or from $y_0$ to $y_{(R_{mux} \times C_{mux}-1)}$, a matrix may be configured as below.

$$\begin{bmatrix} y_0 & y_1 & y_2 & \cdots & y_{C_{mux}-1} \\ y_{C_{mux}} & y_{C_{mux}+1} & y_{C_{mux}+2} & \cdots & y_{2C_{mux}-1} \\ \vdots & \vdots & \vdots & \ddots & \vdots \\ y_{(R_{mux}-1) \times C_{mux}} & y_{(R_{mux}-1) \times C_{mux}+1} & y_{(R_{mux}-1) \times C_{mux}+2} & \cdots & y_{(R_{mux} \times C_{mux}-1)} \end{bmatrix}$$

$C_{mux}$ and $R_{mux}$ are determined to be $R_{mux} = N_{CB}^{CBG_k}$ and $C_{mux} = G/R_{mux}$, respectively. That is, the matrix is configured in a manner of arranging coded bits in the CBG in rows first.

Subsequently, $b_i$ may be configured according to a method of reading $y_m$ in columns of the matrix, and configuring $b_i$. That is, $b_i$ is configured according to a method such as algorithm 1 in the form of pseudocode.

[Algorithm 1]

Set i, m, n to 0.
while i <($R_{max} \times C_{max}$),
  $b_i = y_{m \times C_{max}+n}$
  m = m+1
  i = i+1
  if m=$R_{mux}$,
    set m to 0
    n = n+1
  End if
end while The example is an algorithm used for evenly distributing the bits of the CBs in the CBG, and may be modified to various methods of evenly mixing the CBs and may be applied.

A receiver may need to perform deinterleaving so as to configure a CBG by sequentially reconfiguring the CBs shuffled by interleaving, and deinterleaving may be performed via algorithm 2 shown below.

[Algorithm 2]

Set i, m, n to 0.
while i < ($R_{demux} \times C_{demux}$),
  $y_i = b_{m \times C_{demux}+n}$
  m = m+1
  i = i+1
  if m=$R_{demux}$,
    set m to 0
    n = n+1
  End if
end while $C_{demux}$ and $R_{demux}$ are determined to be $C_{demux} = N_{CB}^{CBG_k}$ and $R_{demux} = G/C_{demux}$, respectively. Algorithm 2 is a method of reading $b_m$ in columns of the following matrix and configuring $y_i$.

$$\begin{bmatrix} b_0 & b_1 & b_2 & \cdots & b_{C_{demux}-1} \\ b_{C_{demux}} & b_{C_{demux}+1} & b_{C_{demux}+2} & \cdots & b_{2C_{demux}-1} \\ \vdots & \vdots & \vdots & \ddots & \vdots \\ b_{(R_{demux}-1) \times C_{demux}} & b_{(R_{demux}-1) \times C_{demux}+1} & b_{(R_{demux}-1) \times C_{demux}+2} & \cdots & b_{(R_{demux} \times C_{demux}-1)} \end{bmatrix}$$

That is, a deinterleaver may change the structure to a structure in which the CBs in the CBG are sequentially mapped. Subsequently, the receiver may perform channel decoding of the CBs and may receive data. The example is an algorithm used for sequentially mapping the bits of the CBs in the CBG, and may be modified to various methods for the above-mentioned purpose and applied.

Figure 10:
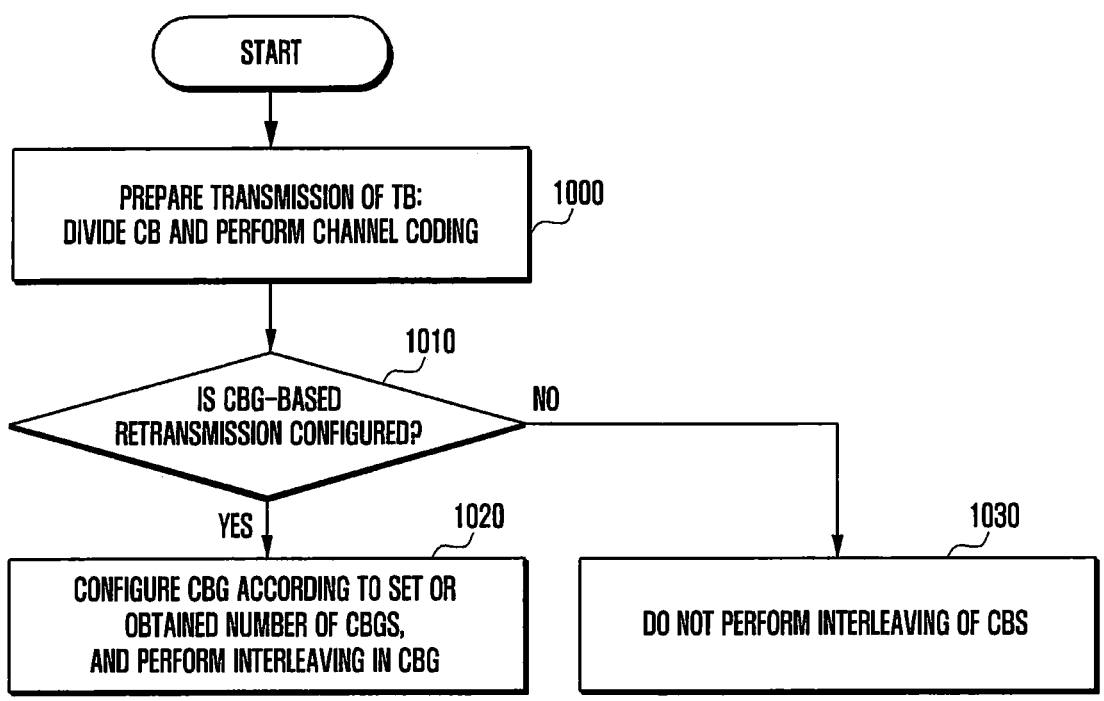
FIG. 10 is a diagram illustrating an operation, by a base station, of transmitting data via CBG interleaving in downlink data transmission.

FIG. 10 is a diagram illustrating an operation, by a base station, of transmitting data via CBG interleaving in downlink data transmission. A base station performs code block division and channel coding in order to prepare for TB transmission in operation 1000. The base station determines whether CBG-based retransmission is configured in operation 1010, and if the CBG-based retransmission is configured, the base station may configure CBGs according to the number of CBGs, which is set or calculated, and may perform interleaving in the CBGs in operation 1020. If the CBG-based retransmission is not configured, the base station may not perform interleaving of CBs in operation 1030. In this instance, the base station may perform TB-based retransmission. Subsequently, the base station may sequentially map data, which are interleaved or not interleaved, to the frequency and/or time resource and may transmit the same. The operations may be performed by a UE in the case of uplink data transmission.

Figure 11:
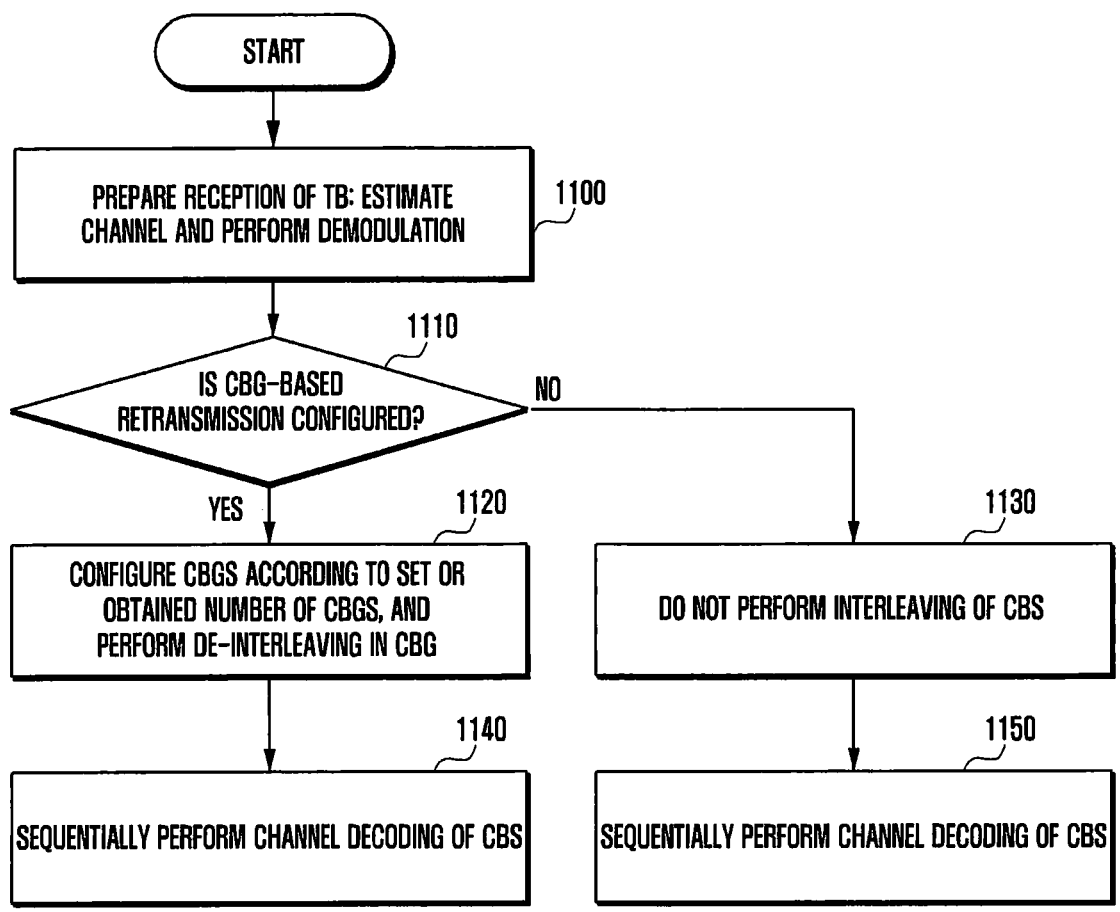
FIG. 11 is a diagram illustrating an operation, by a user equipment (UE), of receiving data via CBG deinterleaving in downlink data transmission.

FIG. 11 is a diagram illustrating an operation, by a UE, of receiving data via CBG deinterleaving in downlink data transmission. A UE performs channel estimation and demodulation for TB reception in operation 1100. The UE determines whether CBG-based retransmission is configured in operation 1110, and if CBG-based retransmission is configured, the UE may configure CBGs according to the number of CBGs, which is set or calculated, and may perform deinterleaving in the CBGs in operation 1120. Subsequently, the UE perform sequential channel decoding of CBs which are reconfigured via deinterleaving in operation 1140. If CBG-based retransmission is not configured, the UE may not perform deinterleaving with respect to the CBs in operation 1130, and may perform sequential channel decoding of the CBs in operation 1150. The operations may be performed by a base station in the case of uplink data transmission.

Although interleaving that evenly mixes the CBs in a CBG has been described in the disclosure, a method of unevenly mixing CBs may be applied. Also, interleaving may be applied only when the number of CBs in a CBG is greater than or equal to a predetermined number.

Also, whether to use the method of performing interleaving in a CBG provided in the disclosure may be determined depending on the configuration by a base station. That is, if the base station performs configuration to use interleaving in a CBG, the base station and a UE may perform interleaving and deinterleaving in the CBG. However, if the base station may perform configuration not to use interleaving in a CBG, the base station and the UE may not perform interleaving and deinterleaving in the CBG. For example, if the base station performs configuration to use interleaving in a CBG, the mapping of the CBG is performed as shown in the diagram 920 of FIG. 9. If the base station performs configuration not to use interleaving in the CBG, the mapping of the CBG is performed as shown in the diagram 910 of FIG. 9. The configuration associated with the usage of interleaving in a CBG may be performed via higher signaling such as MAC CE or RRC signaling.

Second Embodiment

The second embodiment describes a method of setting the number of CBGs (hereinafter, the number of CBGs) in order to configure and use CBG-based retransmission.

A base station may use a CBG-based retransmission method for downlink or uplink data transmission, and the base station needs to be aware of the number of CBGs in order to apply the method. To this end, the base station may set the number of CBGs or the maximum number of CBGs to be used for the UE. In this instance, the base station may set one or more pieces of information associated with the number of CBGs or multiple pieces of information associated with the maximum number of CBGs. In the disclosure, the number of CBGs and the maximum number of CBGs may be interchangeably used.

The base station and the UE may determine the number of CBGs to be used for data transmission from among multiple pieces of set information associated with the number of CBGs, based on a TBS, a TTI length, the number of allocated symbols, and the like. For example, if the base station sets 2, 4, 6, and 8 for the UE as the number of CBGs, the base station may assume that the number of CBGs to be applied to a TBS is 2 if a scheduled TBS is smaller than a first TBS reference value, the base station may assume that the number of CBGs is 4 if a scheduled TBS is greater than the first TBS reference value and smaller than a second TBS reference value, the base station may assume that the number of CBGs is 6 if a scheduled TBS is greater than the second TBS reference value and smaller than a third TB S reference value, and the base station may assume that the number of CBGs is 8 if a scheduled TBS is greater than the third TBS reference value, based on the first TBS reference value, the second TBS reference value, and the third TBS reference value. Alternatively, the number of CBGs may be determined based on the number of configured layers. Alternatively, the number of CBGs to be actually applied among the plurality of set values associated with the number of CBGs may be selected depending on the length of a mini-slot configured to be used, the number of mini-slots existing in a single slot according to a PDCCH monitoring period, or whether a PDCCH monitoring interval exists.

Third Embodiment

The third embodiment describes a method in which a base station uses UE capability reported by a UE in order to determine the number of CBGs to be used by a UE or the number of HARQ-ACK bits to be transmitted by the UE per TB, and the UE transmits, to the base station, various types of information in the form of a UE capability report.

The UE may report, to the base station, the maximum value of the number of HARQ-ACK feedback bits that the UE is capable of transmitting in one slot or one mini-slot, or the maximum value of the number of uplink control information bits that the UE is capable of transmitting using a first PUCCH format, a second PUCCH format, a third PUCCH format, . . . , an $N^{th}$ PUCCH format, and the like, or the type of PUCCH format that the UE is capable of transmitting among n PUCCH formats. The $n^{th}$ PUCCH format may be a PUCCH format having a short TTI or a PUCCH format having a long TTI length. In the disclosure, uplink control information may include a HARQ-ACK feedback.

As another example, when the UE uses the carrier aggregation (CA) technology, the UE may report, to the base station, the maximum value of the number of uplink control information bits that the UE is capable of transmitting for each serving cell that the UE accesses, or the type of PUCCH format that the UE supports.

As another example, the UE reports, to the base station, the maximum value of the number of uplink control information bits that the UE is capable of transmitting or the type of PUCCH format that the UE supports, according to each case based on the number of layers supported in data transmission, a rank, whether coordinated multipoint (CoMP) transmission is allowed, and the like.

When the base station sets, for the UE, the number of CBGs, the maximum number of CBGs, or the number of HARQ-ACK feedback bits that the UE needs to transmit, the base station is capable of setting an arbitrary value based on the UE capability that the UE reports to the base station.

Fourth Embodiment

The fourth embodiment describes a method of transmitting a HARQ-ACK by a UE when downlink data transmission using CBG-based retransmission is performed, or a method of indicating a CBG to be retransmitted when retransmission of downlink or uplink data is indicated.

The base station sets the maximum number of CBGs to be retransmitted in units of CBGs, which is denoted by M in the disclosure. In this instance, if N CBGs are configured for a single TB, and the TB is divided into N CBGs, the entire TB may be retransmitted when retransmission of CBGs, the number of which is greater than M, is required, and corresponding CBGs of which retransmission is required may be retransmitted when transmission of M or fewer CBGs fails and retransmission thereof is required. Using this, the number of HARQ-ACK bits or the number of CBG indication bits may be reduced.

Particularly, the base station configures CBG-based retransmission for the UE, sets the maximum number of CBGs to N, and sets the maximum number of CBGs that can be retransmitted in units of CBGs to M for the UE. In this instance, if a single TB is transmitted in downlink data transmission, the UE transmits a $$\left(\log_2\left(1 + \sum_{m=0}^{M}\binom{N}{m}\right)\right)$$

-bit HARQ-ACK feedback to the base station. In the above expression, $\log_2(x)$ indicates the value of the log of X with base 2. Also, $$\binom{N}{m}$$

indicates the number of random events of selecting m entities among N entities, and (x) indicates the minimum integer, which is greater than X. For example, if N=4 and M is 1, the number of random events of selecting 0 among N is 1, and the number of random events of selecting 1 among N is 4. Accordingly, $$\left(\log_2\left(1 + \sum_{m=0}^{M}\binom{N}{m}\right)\right)$$

is $\log_2(1+1+4)$. Therefore, 3 bits are needed for HARQ-ACK feedback.

"111" among the three bits may be bits that require retransmission of the whole TB. That is, the fact that all the bits of $$\left(\log_2\left(1 + \sum_{m=0}^{M}\binom{N}{m}\right)\right)$$

are "1" may require retransmission of the entire TB. This may be used when transmission of CBGs, the number of which is greater than M, fails. The fact that transmission of CBGs, the number of which is less than or equal to M, fails may be indicated by a value including $$\left(\log_2\left(1 + \sum_{m=0}^{M}\binom{N}{m}\right)\right)$$

bits, which may be obtained using a separate equation.

That is, if transmission of CBGs, the number of which is greater than M, fails, the entire TB is retransmitted. If transmission of CBGs, the number of which is less than M, fails, HARQ-ACK feedback bits may be configured to enable CBG-based retransmission. Accordingly, the number of HARQ-ACK bits may be reduced compared to the case of providing indication for each CBG.

Similar to the HARQ-ACK feedback transmission method, a CBG indicator (CBG indication) for CBG-based retransmission may be used for downlink and uplink retransmission. The CBG indicator has $$\left(\log_2\left(1 + \sum_{m=0}^{M}\binom{N}{m}\right)\right)$$

bits, and may be included in DCI for downlink and uplink scheduling. The method of configuring HARQ-ACK feedback bits, which has been described, may be equally applied to the configuration of $$\left(\log_2\left(1 + \sum_{m=0}^{M}\binom{N}{m}\right)\right)$$

bits. If all of bits $$\left(\log_2\left(1 + \sum_{m=0}^{M}\binom{N}{m}\right)\right)$$

are "1", the fact may indicate that retransmission of all CBGs of the corresponding TB is performed or is requested.

Fifth Embodiment

The fifth embodiment may provide a method of mapping a single CB to an integer number of symbols when CBs are mapped to allocated frequency and time resources for data transmission.

Figure 12:
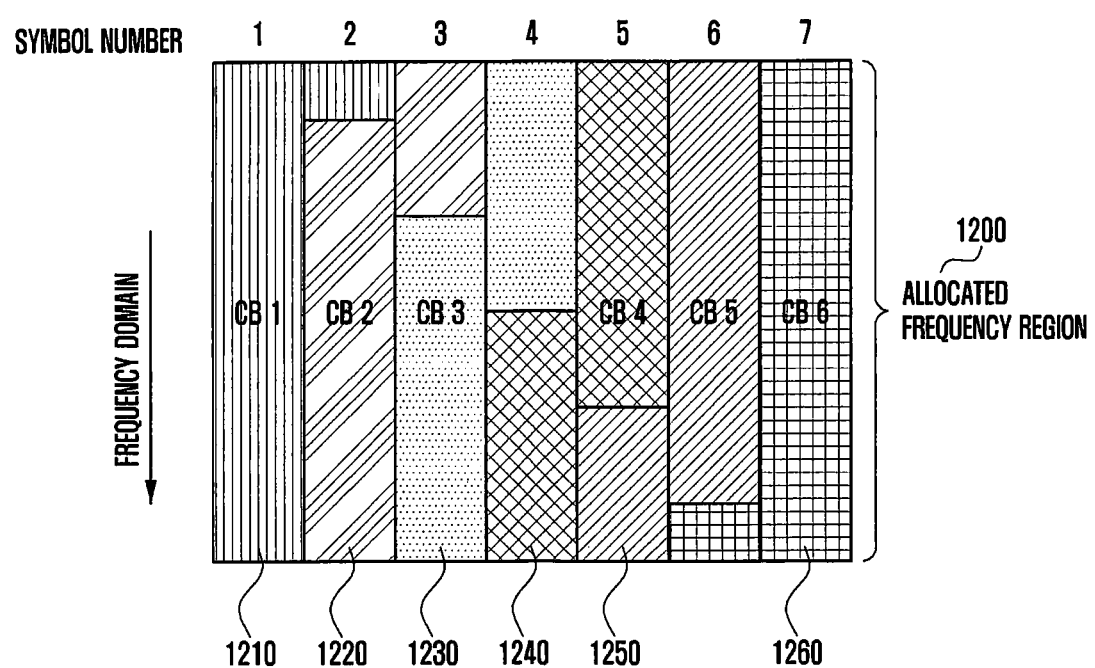
FIG. 12 is a diagram illustrating an example in which 6 code blocks are mapped to allocated frequency-time resources.

FIG. 12 is a diagram illustrating an example in which 6 code blocks are mapped to an allocated frequency-time resource. In the legacy LTE system, it is defined that the allocated frequency-time resource is divided by the number of CBs, and the CBs are mapped to almost the same number of REs. FIG. 12 illustrates an example in which 6 CBs are mapped to an allocated resource 1200 by dividing the allocated resource 1200 into REs, the number of which is almost the same as the number of CBs. According to FIG. 12, a first CB 1210 is mapped to a first symbol, the first CB 1210 and a second CB 1220 are mapped to a second symbol, the second CB 1220 and a third CB 1230 are mapped to a third symbol, the third CB 1230 and a fourth CB 1240 are mapped to a fourth symbol, the fourth CB 1240 and a fifth CB 1250 are mapped to a fifth symbol, and the fifth CB 1250 and a sixth CB 1260 are mapped to a sixth symbol.

If the mapping scheme of FIG. 12 is used in the NR system, in the case in which CBs to be mapped to the fifth symbol are punctured and data for another service to be transmitted to another UE or the same UE is mapped instead, transmission of all the CBs to be mapped to the fifth symbol may fail. That is, if the fourth CB 1240 and the fifth CB 1250 are punctured, transmission of the fourth CB 1240 and the fifth CB 1250 may fail. Therefore, in order to minimize deterioration in performance due to CBs punctured for another UE or another service data transmission, a single CB may be mapped to one or two or more OFDM symbols when the number of scheduled CBs is smaller than the number of allocated OFDM symbols. Also, when the number of scheduled CBs is greater than the number of allocated OFDM symbols, one or two or more CBs, that is, an integer number of CBs, may be mapped to a single OFDM symbol. In this manner, the last of the CBs and the end of the OFDM symbol may be maximally aligned.

Figure 13:
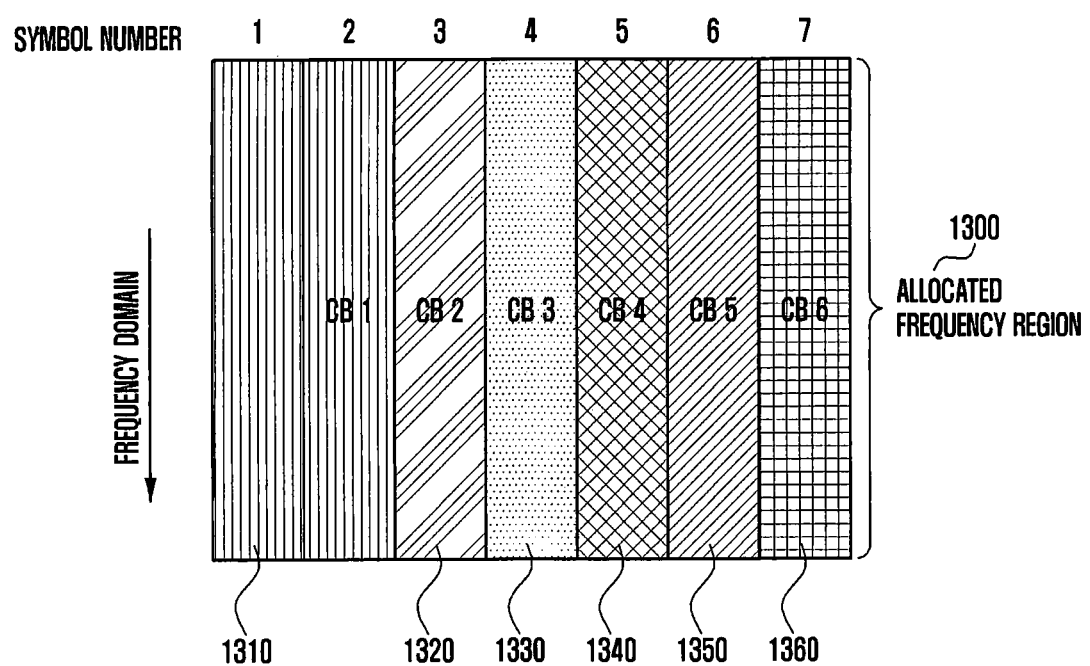
FIG. 13 is a diagram illustrating an example of a mapping scheme for CB and OFDM symbol alignment.

FIG. 13 is a diagram illustrating an example of a mapping scheme in order to perform CB and OFDM symbol alignment when seven OFDM symbols are allocated for data transmission in a frequency domain 1300 allocated to a UE and a total of 6 CBs are scheduled to be transmitted. A first CB1 1310 is mapped to two OFDM symbols, and each of the remaining CBs, that is, each of a second CB 1320, a third CB 1330, a fourth CB 1340, a fifth CB 1350, and a sixth CB 1360, is mapped to a single OFDM symbol. To this end, the number of information bits included in each CB may be different. For CB sizes having different lengths, the base station may divide a corresponding TB by the number of CBs in consideration of the number of symbols of the resource allocated to the UE.

Figure 14:
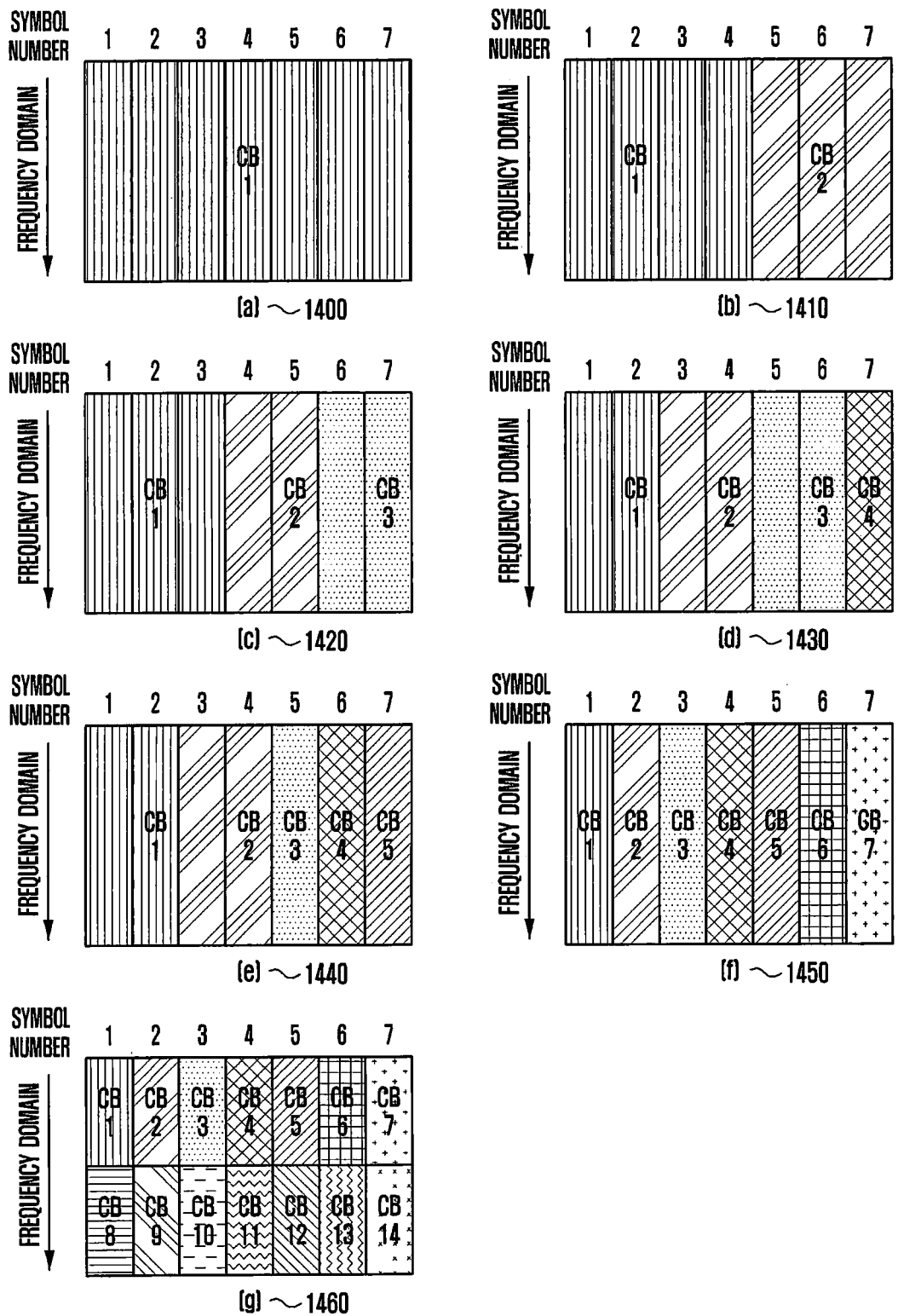
FIG. 14 is a diagram illustrating an example of aligning and mapping symbols and CBs when one or more CBs are mapped to allocated resources.

FIG. 14 is a diagram illustrating an example of aligning and mapping symbols and CBs when one or more CBs are mapped to an allocated resource. Diagram 1400, diagram 1410, diagram 1420, diagram 1430, diagram 1240, diagram 1450, and diagram 1460 of FIG. 14 are diagrams illustrating examples of maximally aligning CBs and symbols when 1, 2, 3, 4, 5, 7, and 14 CBs are mapped to an allocated resource, respectively. Mapping of FIG. 14 is also allowed.

Sixth Embodiment

The sixth embodiment provides a method in which a DCI informs a UE of the number of CBGs currently transmitted by a base station in a downlink or that need to be transmitted in an uplink.

The base station may schedule one or two TBs for the UE. In this instance, a predetermined bit field of the DCT may indicate information associated with the sum of the number of CBGs included in the two TBs. For example, if higher signaling sets the maximum number of CBGs included in a single TB to 4, a maximum of 8 CBGs may exist in the two TBs. When the base station schedules initial transmission or retransmission for the UE, the base station may inform the UE of the number of CBGs that the base station currently transmits using a predetermined bit field of the DCI. For example, if it is assumed that only a first CBG in the first TB is retransmitted and that second and third CBGs in the second TB are retransmitted, the DCI that performs scheduling may provide information indicating that three CBGs are transmitted using three bits, such as "010". That is, it may be understood that a value obtained by converting the value of three bits of the DCI into a decimal number, and adding 1 to the decimal number, is the number of CBGs.

Accurate information associated with CBGs currently transmitted may be obtained based on HARQ-ACK information associated with a corresponding TB that the UE transmits to the base station. When only a first CBG is retransmitted in the first TB and second and third CBGs are retransmitted in the second TB in the retransmission as mentioned above, the fact shows that decoding of the first CBG in the first TB fails and decoding of the second and third CBGs in the second TB fails in the initial transmission. Accordingly, the UE is presumed to have transferred decoding result information corresponding thereto to the base station via a HARQ-ACK using multiple bits. Therefore, the HARQ-ACK information may be information associated with a CBG that is retransmitted.

In the case of uplink data transmission, similarly, information indicating the number of CBGs that are retransmitted may be included in DCI indicating retransmission.

Seventh Embodiment

The seventh embodiment describes a process of transmitting a HARQ-ACK when a UE operates in a single-component carrier, that is, carrier aggregation (CA) is not configured, and CBG-based retransmission is performed, in downlink transmission.

The base station may configure, for the UE, two physical resources for HARQ-ACK transmission with respect to downlink data. The resources may include only PRB indices in the frequency domain, or may include information associated with the number of OFDM symbols to be used. The two resources may be the resources for mapping an uplink control channel (PUCCH). Therefore, the two resources may be referred to as a first PUCCH resource and a second PUCCH resource, respectively. The first PUCCH resource may be used for transmitting 1-bit HARQ-ACK information, and the second PUCCH resource may be used for transmitting an amount of HARQ-ACK information greater than 1 bit.

If CBG retransmission is configured, and the number of CBGs is greater than 1, the UE may transmit HARQ-ACK information using the second PUCCH resource in order to transmit HARQ-ACK information with respect to the CBGs. If a CBG is configured, and transmission of all CBGs is successful or fails, the UE may transmit 1-bit HARQ-ACK information using the first PUCCH resource.

Whether transmission of a CBG is successful may be determined based on whether CBs included in the CBG pass CRC check or whether a CRC inserted for each CBG passes CRC check. Even if it is determined that transmission of all CBGs is successful, if CRC check performed in units of TBs fails, the UE may use the first PUCCH resource in order to transmit corresponding HARQ-ACK information. For example, if all CBs pass CRC check, but a TB fails CRC check, the first PUCCH resource may be used. The PUCCH formats transmitted in the first PUCCH resource and the second PUCCH resource may be different. The base station may configure each PUCCH format to be used for the UE via higher signaling.

<Eight Embodiment>

The eighth embodiment describes a method in which a UE transmits a HARQ-ACK feedback to a base station when the UE, for which partial retransmission is configured, receives downlink transmission. The present embodiment relates to a method in which a UE configures one or more bits in order to generate CB group (CBG)-based HARQ-ACK information. Particularly, the embodiment may be applicable when the number of CBs included in a scheduled TB is smaller than the set number of CBGs or the set maximum number of CBGs. For example, there is the case in which the set maximum number of CBGs is 7 and the number of CBs included in a scheduled TB is less than 7.

The set number of CBGs or the set maximum number of CBGs is referred to as N_{CBG,max}. N_{CBG,max} is interchangeably used with $N_{CBG,max}$. The number of CBs included in the scheduled TB is denoted by C. In the embodiment, C, which is the number of CBs included in the TB, may be equal to M, which is the number of CBGs of the corresponding TB. Therefore, in the following embodiment, the number of CBs, which is C, may indicate the number of CBGs, which is M.

If the number of CBs included in the scheduled TB is less than the set number of CBGs or the set maximum number of CBGs, that is, if M<N_{CBG,max}, the UE may configure first M bits depending on whether decoding of each CBG is successful when the UE configures HARQ-ACK information including N_{CBG,max} bits. For example, if decoding of a $k^{th}$ CBG is successful, a $k^{th}$ bit is set to 0. If decoding of the $k^{th}$ CBG fails, the $k^{th}$ bit is set to 1. Whether decoding of a CBG is successful may be determined by the UE depending on whether CBs in the CBG pass CRC check. Since the number of CBs is less than the set number of CBGs in the above example, the number of CBGs actually included in the corresponding TB is C=M, and each CBG includes one CB. Therefore, whether decoding of the $k^{th}$ CB is successful is the same as whether the $k^{th}$ CBG transmission is successful.

Hereinafter, provided is a method in which the UE configures N_{CBG,max}-M bits, which excludes the first M bits, when configuring HARQ-ACK information including N_{CBG,max} bits. Although the present embodiment illustrates the case of M<N_{CBG,max} or C<N_{CBG,max}, the embodiment may be applicable to M=N_{CBG,max} or M=N_{CBG,max}.

The N_{CBG,max}-M bits, which exclude the first M bits when the UE configures HARQ-ACK information including N_{CBG,max} bits, may be determined according to M-bit ACK/NACK information. Although it is described that "1" is mapped in the case of ACK and "0" is mapped in the case of NACK, the principle of the embodiment may be applicable in the opposite case. For example, if at least one "1" is included in the front M bits (i.e., if at least one CBG is successfully decoded), the UE may determine all N_{CBG,max}-M bits to be "1". If all of the front M bits are "0" (i.e., only if decoding of all CBGs fails), the UE may determine all N_{CBG,max}-M bits to be "0". The example may be determined based on the following equation. O_k indicates a $k^{th}$ HARQ-ACK bit.

O_k: HARQ ACK(1) or NACK(0) for k-th CBG, where 0≤k<M $O\_k = \Pi_{i=0}^{M-1}(1-O_i)$, where M≤k<N_{CBG,max}

Alternatively, if decoding of at least one CBG fails, the UE may set all N_{CBG,max}-M bits to "0", and only if all CBGs are successfully decoded, the UE may set all N_{CBG,max}-M bits to "1", which may be expressed by the following equation.

O_k: HARQ ACK(1) or NACK(0) for k-th CBG, where 0≤k<M $O\_k = \Pi_{i=0}^{M-1}$, where M≤k<N_{CBG,max}

In the above equation, $\Pi_{i=0}^{M-1}O_i$ may be replaced with a binary AND operation of O_i, 0=i<M, and may have the same meaning.

Alternatively, there is a method of repeating the front M bits so as to fill N_{CBG,max}-M bits, which may be expressed by the following equation.

O_k: HARQ ACK(1) or NACK(0) for k-th CBG, where 0≤k<M

O_k=O_mod(k, M), where M≤k<N_{CBG,max}

The equation may be expressed as the following equation.

O_k: FLARQ ACK(1) or NACK(0) for mod(k, M)-th CBG, where 0≤k<N_{CBG,max}

In the embodiment, mod(a,b) may be a remainder obtained by dividing a by b, and may be expressed as a—floor(a/b)Xb. In the embodiment, floor(x) is the maximum integer that is not greater than x.

Alternatively, N_{CBG,max}-M bits may be determined depending on whether TB-CRC check is successful. If TB-CRC check is successful, all the N_{CBG,max}-M bits are set to "1", and otherwise, N_{CBG,max}-M bits are set to "0", which may be expressed by the following equation.

O_k: HARQ ACK(1) or NACK(0) for k-th CBG, where $0 \leq k < M$ $O\_k = \begin{cases} 1, & \text{if } TB\text{-}CRC \text{ is passed.} \\ 0, & \text{otherwise} \end{cases}$, where $M \leq k < N\_\{CBG, \max\}$ As another example, although it is determined that all CBGs are successfully transmitted since all CRCs added to CBs pass CRC check, but a CRC added to a TB does not pass TB-CRC check, all HARQ-ACK bits may be set to "0", which may be expressed by the following equation.

$O\_k = \begin{cases} 0, & \text{if } \Pi_{i=0}^{M-1}O_i = 1 \text{ and } TB\text{-}CRC \text{ is not passed.} \\ HARQ\ ACK(1) \text{ or } NACK(0) \text{ for } k\text{-}th\ CBG, & \text{otherwise} \end{cases}$, where $0 \leq k < M$ $O\_k = \begin{cases} 1, & \text{if } TB\text{-}CRC \text{ is passed.} \\ 0, & \text{otherwise} \end{cases}$, where $M \leq k < N\_\{CBG, \max\}$ According to the above-described embodiments, when N_{CBG,max}-M bits, which excludes M bits having HARQ-ACK information associated with CBGs as a bitmap, are configured, M-bit information that has HARQ-ACK information of CBGs as a bitmap may be used, and thus the decoding performance of the base station that receives the HARQ-ACK information may be increased.

Alternatively, a method of unconditionally fixing N_{CBG,max}-M bits to "0" or "1" may be used as shown in the following equation.

O_k: HARQ ACK(1) or NACK(0) for k-th CBG, where 0≤k<M

O_k=0, where M≤k<N_{CBG,max} or $O\_k$: HARQ $ACK(1)$ or $NACK(0)$ for $k$-th CBG,
where $0 \leq k < M$ $O\_k = 1$, where $M \leq k < N\_\{CBG,max\}$.

$O\_k$, which is fixed to "0" or "1" in the above equation, is assumed to be a known bit when the base station performs decoding, and thus the decoding performance may increase. For example, when uplink control information including HARQ-ACK information is encoded using a polar code and is transmitted, the base station may configure a HARQ-ACK information bit fixed to "0" or "1" as a fronzen bit and may perform decoding of the polar code.

Figure 15:
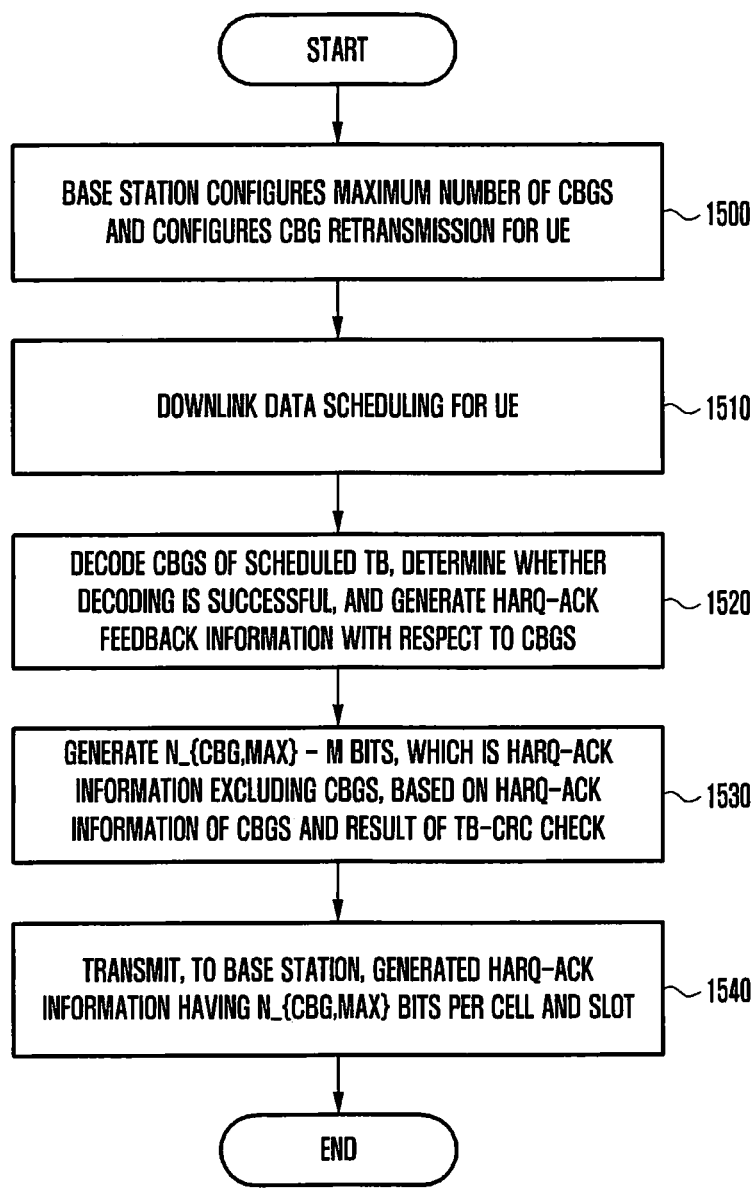
FIG. 15 is a flowchart illustrating the operation of a base station related to a UE that generates HARQ-ACK information according to CBG configuration.

FIG. 15 is a flowchart illustrating operation of a base station related to a UE that generates HARQ-ACK information. The base station configures CBG retransmission for a UE, and sets parameters, such as the maximum number of CBGs or the like, using higher signaling in operation 1500. Subsequently, the base station schedules downlink data for the UE in operation 1510, and the UE determines the number of CBGs actually transmitted in a scheduled TB. M-bit HARQ-ACK feedback information may be generated depending on whether decoding of M scheduled CBGs is successful in operation 1520. If M is less than N_{CBG, max}, the UE generates HARQ-ACK information including N_{CBG,max}−M bits using the M-bit HARQ-ACK information generated based on the above-described method or on whether TB-CRC check is successful, or using the two pieces of information in operation 1530. The UE transmits the generated HARQ-ACK information including N_{CBG, max} bits per cell or slot to the base station in an uplink in operation 1540.

Ninth Embodiment

The ninth embodiment provides a method in which a UE configures HARQ-ACK information. Particularly, the ninth embodiment provides a method associated with an order of configuration when HARQ-ACK bits with respect to CBGs, transmitted in multiple component carriers or a bandwidth part, or multiple slots, are configured.

$O^{ACK}$ is the number of HARQ-ACK feedback bits that the UE needs to transmit in a predetermined slot or mini-slot, and a HARQ-ACK feedback information sequence is $\tilde{o}_0^{ACK}, \tilde{o}_1^{ACK}, \ldots, \tilde{o}_{O^{ACK}-1}^{ACK}$.

$N_{cells}^{DL}$ denotes the number of component carriers that the UE uses to transmit a HARQ-ACK feedback in a single uplink transmission in a predetermined slot or mini-slot. $B_c^{DL}$ denotes the number of downlink PDSCHs or downlink slots or mini-slots that the UE uses to transmit a HARQ-ACK feedback in a single uplink transmission in a predetermined slot or mini-slot. $N_c^{CBG,max}$ denotes the maximum number of CBGs set in a $c^{th}$ component carrier. This is the maximum number of CBGs per TB, and may be the number of HARQ-ACK bits that the UE needs to transmit for a single TB. $o_{c,l,i}^{ACK}$ denotes HARQ-ACK feedback information for an $i^{th}$ CBG in a TB transmitted in a first slot or mini-slot of a $C^{th}$ component carrier. If the number of CBs in the corresponding TB is less than $N_c^{CBG,max}$, the number of CBGs in the TB may be less than $N_c^{CBG,max}$. Bits excluding the HARQ-ACK information bits corresponding to CBGs from $N_c^{CBG,max}$ that the UE needs to transmit may be determined by an arbitrary scheme. For example, the bits may be determined according to the seventh embodiment.

Hereinafter, provided is pseudocode (pseudo-code) for the case in which one codeword (CW) per PDSCH, that is, one TB, is included.

[Pseudo-code 1]

```
[start]
Set c = 0 - cell index: lower indices correspond to lower RRC indices of corresponding cell
Set j = 0 - HARQ-ACKbit index
while c< N_cells^DL
    set l = 0;
    while l< B_c^DL
        set i=0;
        set M=min(C, N_c^CBG,max), where C is the number of CBs in the TB of cell c in slot l;
        while i<N_c^CBG,max
            if i<M
                õ_j^ACK = o_c,l,i^ACK HARQ-ACKbit of i-th CBG in the TB of cell c in slot l,
            else if
                õ_j^ACK = o_c,l,i^ACK binary AND operation of the HARQ-ACK bits corresponding
    to m-th CBGs for where 0≤m < M of i-th CBG in the TB of cell c in slot l
            end if
            j = j + 1
            i = i+1
        end while
        l = l+1
    end while
    c = c + 1
end while
[end]
```

Figure 16A:
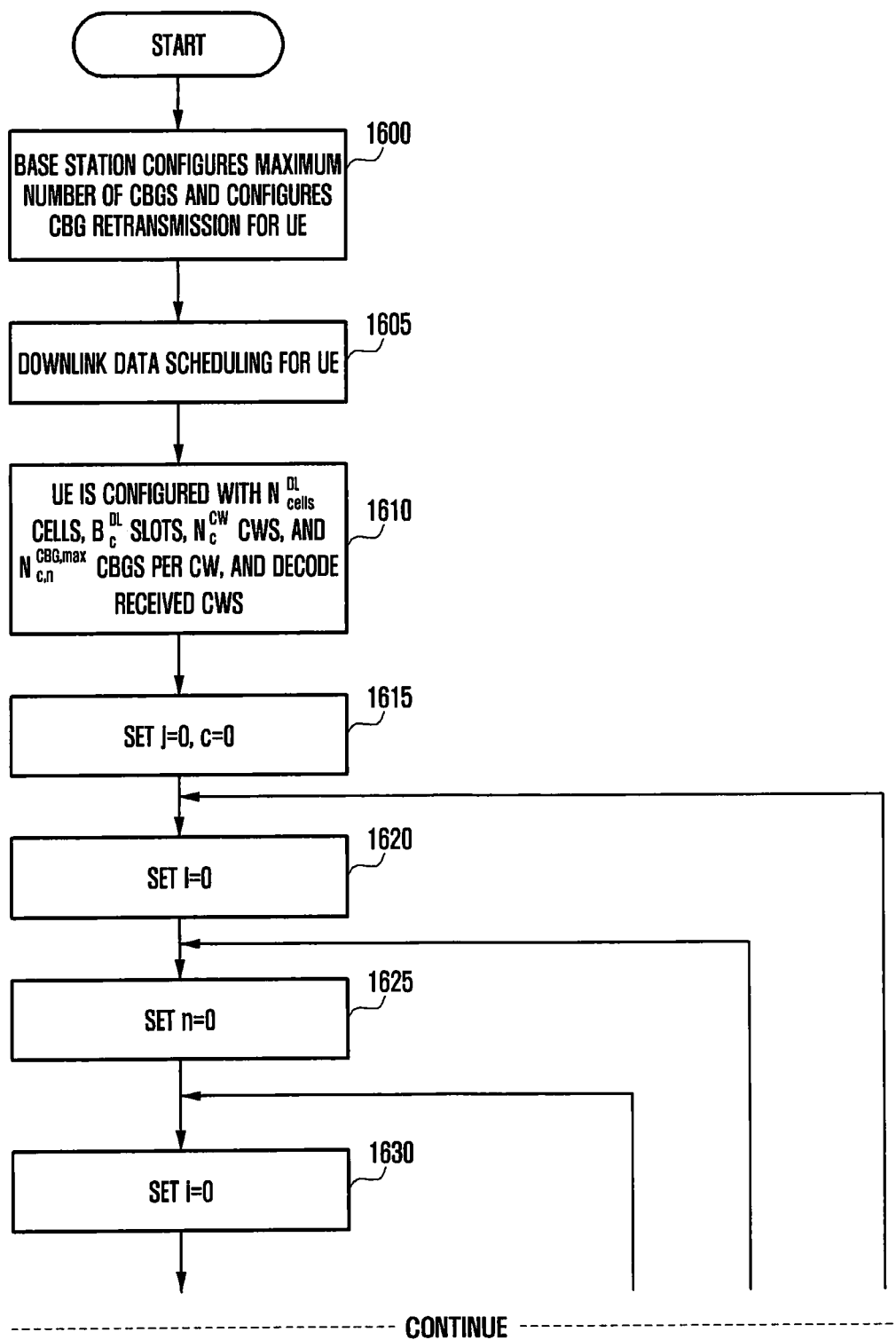
FIGS. 16A and 16B are diagrams illustrating a method of configuring HARQ-ACK feedback information if a component carrier which is configured to transmit two CWs per TB is included.
Figure 16B:
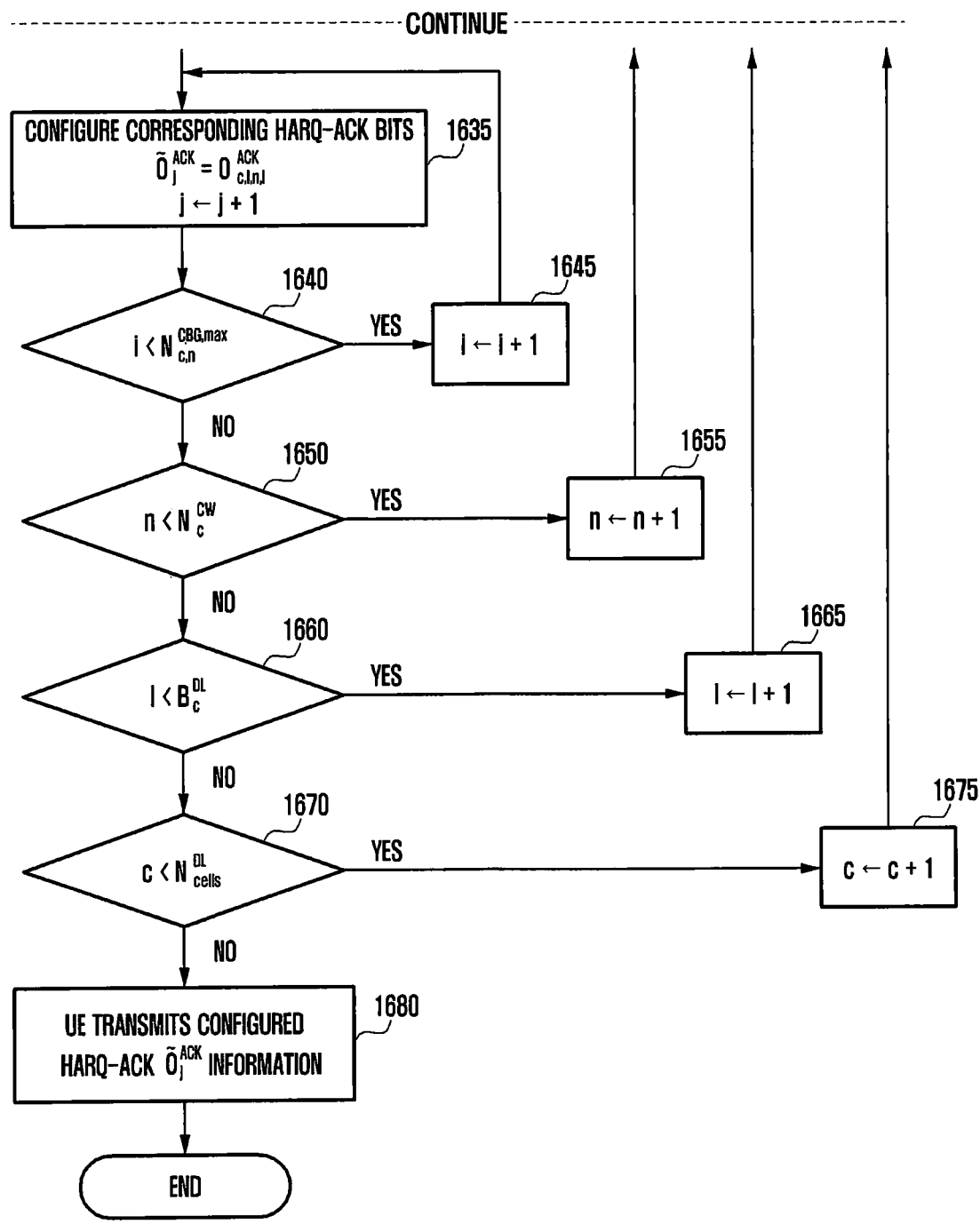

The pseudocode may be expressed via a flowchart similar to FIGS. 16A and 16B.

If a component carrier that is configured to transmit two CWs per TB is included, the following pseudocode 2 may be used. $N_c^{CW}$ denotes the number of CWs included in a single PDSCH in a $c^{th}$ component carrier, and may be set by higher signaling or L1 signaling. $N_{c,n}^{CBG,max}$ denotes the maximum number of CBGs in an $n^{th}$ CW set in a $c^{th}$ component carrier. This is the maximum number of CBGs per CW, and may be the number of HARQ-ACK bits that the UE needs to transmit for a single CW. $o_{c,l,n,i}^{ACK}$ denotes HARQ-ACK feedback information for an $i^{th}$ CBG in an $n^{th}$ CW transmitted in a first slot or mini-slot of a $c^{th}$ component carrier. If the number of CBs in the corresponding CW is less than $N_{c,n}^{CBG,max}$, the number of CBGs in the CW may be less than $N_{c,n}^{CBG,max}$. Bits excluding the HARQ-ACK information bits corresponding to CBGs from $N_{c,n}^{CBG,max}$ that the UE needs to transmit may be determined by an arbitrary scheme. For example, the bits may be determined according to the seventh embodiment. $N_{c,n}^{CBG,max}$ may be set to be different or the same for each CW. In the disclosure, a CW and a TB may be interchangeably used.

operation 1660. If 1 is less than $B_c^{DL}$, the UE performs configuration by substituting l=l+1 in operation 1665, and returns to operation 1625. If l is not less than $B_c^{DL}$, the UE determines whether c is less than $N_{cells}^{DL}$ in operation 1670.

---

[Pseudo-code 2]

---

```
[start]
Set c = 0 – cell index: lower indices correspondto lower RRC indices of corresponding cell
Set j = 0 – HARQ-ACKbit index
while c < N_cells^DL
    set l = 0;
    while l< B_c^DL
        set n=0;
        while n<N_c^DW
            set i=0;
            set M=min(C, N_{c,n}^{CBG,max}), where C is the number of CBs in the n-th CW of cell c in slot l;
            while i<N_{c,n}^{CBG,max}
                if i<M
                    õ_j^ACK = o_{c,l,n,i}^ACK HARQ-ACK bit of i-th CBG in the n-th CW of cell
    c in slot l,
                else if
                    õ_j^ACK = o_{c,l,n,i}^ACK binary AND operation of the HARQ-ACK bits
                corresponding to m-th CBGs for where 0≤m < M of i-th CBG in the n-th CW of cell c in slot l
                end if
                j = j + 1
                i = i+1
            end while of i
            n=n+1
        end while of n
        l = l+1
    end while of l
    c = c + 1
end while of c
[end]
```

---

[end]

The pseudocode may be expressed via the flowchart illustrated in FIGS. 16A and 16B. FIGS. 16A and 16B are diagrams illustrating a method of configuring HARQ-ACK feedback information if a component carrier that is configured to transmit two CWs per TB is included.

Referring to FIGS. 16A and 16B, the base station configures the maximum number of CBGs and configures CBG retransmission for a UE in operation 1600. The base station schedules downlink data for the UE in operation 1605. The UE identifies configured $N_{cells}^{DL}$ cells (component carriers), $B_c^{DL}$ slots, the number $N_c^{CW}$ of CWs, and the maximum number $N_{c,n}^{CBG,max}$ of CBGs in an $n^{th}$ CW configured in a $c^{th}$ component carriers, and the UE performs decoding of received CWs in operation 1610.

Subsequently, the UE sets a HARQ-ACK bit index j to "0" and sets a cell index c to "0" in operation 1615, sets l=0 in order to obtain the number of slots that the UE needs to use to transmit a HARQ-ACK feedback in a predetermined slot in operation 1620, sets n=0 in order to obtain the number of CWs included in a component carrier in operation 1625, and sets i=0 in order to obtain the number of HARQ-ACK bits that the UE needs to transmit for a single CW in operation 1630.

The UE configures corresponding HARQ-ACK bits using O^ACK_j=$o_{c,l,n,i}^{ACK}$, and may perform configuration by substituting j=j+1 in operation 1635. Subsequently, the UE determines whether i is less than $N_{c,n}^{CBG,max}$ in operation 1640. If it is, the UE performs configuration by substituting i=i+1 in operation 1645 and returns to operation 1635. If i is not less than $N_{c,n}^{CBG,max}$, the UE determines whether n is less than $N_c^{CW}$ in operation 1650. If n is less than $N_c^{CW}$, the UE performs configuration by substituting n=n+1 in operation 1655 an turns to operation 1630. If n is not less than $N_c^{CW}$, the UE determines whether 1 is less than $B_c^{DL}$ in If c is less than $N_{cells}^{DL}$, the UE performs configuration by substituting c=c+1 in operation 1675, and returns to operation 1620. If c is not less than $N_{cells}^{DL}$, the UE transmits the configured HARQ-ACK information to the base station in operation 1680.

The pseudocode is determined in the order of 1) binding HARQ-ACK information of CBGs in a TB, 2) binding HARQ-ACK information of TBs in a single slot or mini-slot, and 3) binding HARQ-ACK information of a component carrier when a HARQ-ACK for CBGs is configured. Therefore, the pseudocode may be modified and applied according to the principle.

Figure 17:
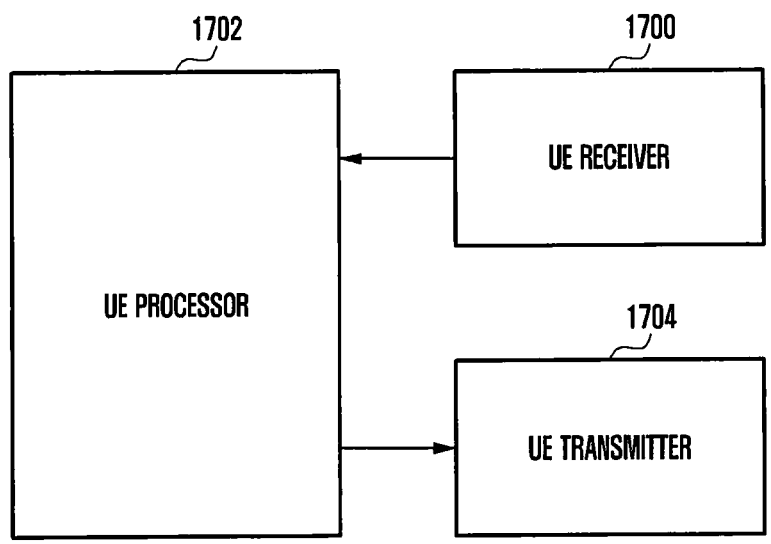
FIG. 17 is a block diagram illustrating the internal structure of a UE according to an embodiment of the disclosure.
Figure 18:
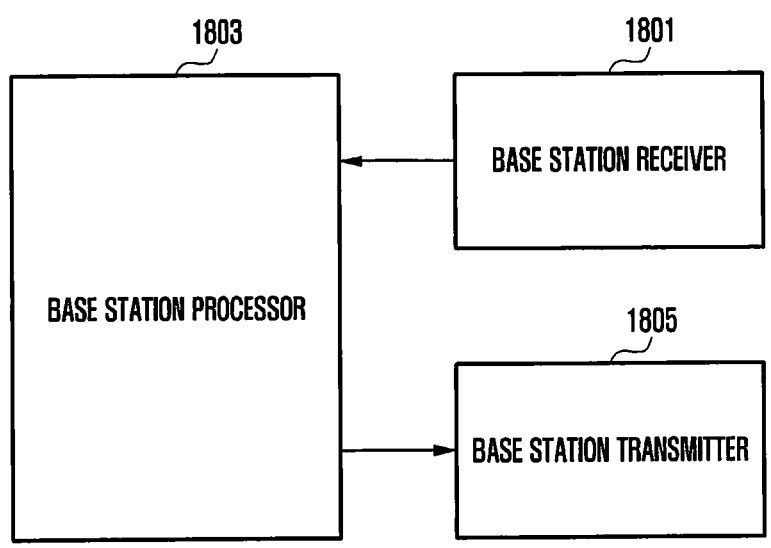
FIG. 18 is a block diagram of the internal structure of a base station according to an embodiment of the disclosure.

To implement the above-described embodiments of the disclosure, a transmitter, a receiver, and a processor of each of a UE and a base station are illustrated in FIGS. 17 and 18. The first to ninth embodiments have described transmission or reception methods of a base station and a UE in order to determine and receive control information for partial retransmission. To implement the methods, receivers, processors, and transmitters of the base station and the UE may operate according to embodiments.

Particularly, FIG. 17 is a block diagram of the internal structure of a UE according to an embodiment of the disclosure. As illustrated in FIG. 17, the UE of the disclosure may include a UE receiver 1700, a UE transmitter 1704, and a UE processor 1702. The UE receiver 1700 and the UE transmitter 1704 are commonly called a transceiver in the embodiment of the disclosure. The transceiver may transmit or receive a signal to/from a base station. The signal may include control information and data. To this end, the transceiver includes an RF transmitter that up-converts and amplifies the frequency of a transmitted signal, an RF receiver that low-noise amplifies a received signal and down-converts the frequency, and the like. Also, the transceiver outputs, to the UE processor 1702, a signal received via a radio channel, and transmits a signal output from the UE processor 1702 via a radio channel.

The UE processor 1702 may control a series of processes such that the UE operates according to the above-described embodiments of the disclosure. For example, in the case of reception of a data signal from a base station, the UE receiver 1700 may receive a CB group indicator, a CB group NDI, and data, and the UE processor 1702 performs deinterleaving according to the number of CBGs, and performs data decoding according to the CB group indicator and the CB group NDI. Subsequently, the UE transmitter 1704 may transfer HARQ-ACK information associated with a CB group to the base station.

FIG. 18 is a block diagram of the internal structure of a base station according to an embodiment of the disclosure. As illustrated in FIG. 18, the base station of the disclosure may include a base station receiver 1801, a base station transmitter 1805, and a base station processor 1803. The base station receiver 1801 and the base station transmitter 1805 are commonly called a transceiver in the embodiments of the disclosure. The transceiver may transmit or receive a signal to/from a UE. The signal may include control information and data. To this end, the transceiver includes an RF transmitter that up-converts and amplifies the frequency of a transmitted signal, an RF receiver that low-noise amplifies a received signal and down-converts the frequency, and the like. Also, the transceiver outputs, to the base station processor 1803, a signal received via a radio channel, and transmits a signal output from the base station processor 1803 via a radio channel.

The base station processor 1803 may control a series of processes such that the base station operates according to the above-described embodiments of the disclosure. For example, the base station processor 1803 may perform control so as to: perform CBG interleaving according to the number of CBGs; set the number of CBGs for a UE; determine whether to inset a CB group indicator and a CB group NDI; and generate a CB group indicator, CB group NDI information, and corresponding data to be transmitted to the UE. Subsequently, the base station transmitter 18-05 transmits control information including the CB group indicator and CB group NDI, and the base station receiver 1801 receives feedback information for each CB group for which transmission is successful.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Also, individual embodiments may be combined as needed. For example, a UE and a base station may operate according to the combination of parts of the first embodiment and the third embodiment. Also, other modifications which are made based on the technical idea of the above-described embodiments may be applied to an LTE system, 5G system, NR system, or the like.

The invention claimed is:

1. A method of receiving hybrid automatic repeat request-acknowledgement (HARQ-ACK) information in a wireless communication system, the method comprising:
   transmitting, to a user equipment (UE), configuration information indicating a first resource and a second resource by a higher layer signaling;
   transmitting, to the UE, downlink control information for scheduling downlink data;
   transmitting the downlink data; and
   receiving HARQ-ACK information with respect to the downlink data from the UE,
   wherein the downlink data includes at least one code block group,
   wherein the HARQ-ACK information indicates acknowledgement information or non-acknowledgement information with respect to each of the at least one code block group,
   wherein the HARQ-ACK information is received via the second resource in case the downlink data includes more than one code block groups, and
   wherein the HARQ-ACK information is received via the first resource instead of the second resource, in case that the HARQ-ACK information indicates that a transmission of all of the at least one code block group is successful, and
   wherein the HARQ-ACK information is received via the first resource instead of the second resource, in case that the HARQ-ACK information indicates that the transmission of all of the at least one code block group fails.

2. The method as claimed in claim 1, wherein one or more code blocks are interleaved in a code block group to which the one or more code blocks belong.

3. The method as claimed in claim 1, wherein the HARQ-ACK information received via the first resource includes one bit, and the HARQ-ACK information received via the second resource includes more than one bit.

4. The method as claimed in claim 1, wherein each of at least one code block included in the at least one code block group is mapped to an integer number of symbols.

5. A method of transmitting hybrid automatic repeat request-acknowledgement (HARQ-ACK) information in a wireless communication system, the method comprising:
   receiving, from a base station, configuration information indicating a first resource and a second resource by a higher layer signaling;
   receiving, from the base station, downlink control information for scheduling downlink data;
   receiving the downlink data; and
   transmitting, to the base station, HARQ-ACK information with respect to the downlink data,
   wherein the downlink data includes at least one code block group,
   wherein the HARQ-ACK information indicates acknowledgement information or non-acknowledgement information with respect to each of the at least one code block group,
   wherein the HARQ-ACK information is transmitted via the second resource in case the downlink data includes more than one code block groups, and
   wherein the HARQ-ACK information is transmitted via the first resource instead of the second resource, in case that the HARQ-ACK information indicates that a transmission of all of the at least one code block group is successful, and
   wherein the HARQ-ACK information is transmitted via the first resource instead of the second resource, in case that the HARQ-ACK information indicates that the transmission of all of the at least one code block group fails.

6. The method as claimed in claim 5, wherein one or more code blocks are interleaved in a code block group to which the one or more code blocks belong.

7. The method as claimed in claim 5, wherein the HARQ-ACK information transmitted via the first resource includes one bit, and the HARQ-ACK information transmitted via the second resource includes more than one bit.

8. The method as claimed in claim 5, wherein each of at least one code block included in the at least one code block group is mapped to an integer number of symbols.

9. A base station for receiving hybrid automatic repeat request-acknowledgement (HARQ-ACK) information in a wireless communication system, the base station comprising:
   a transceiver; and
   a controller connected to the transceiver, and configured to perform control so as to transmit, to a user equipment (UE), configuration information indicating a first resource and a second resource by a higher layer signaling, to transmit downlink control information for scheduling downlink data to the UE, to transmit the downlink data, and to receive HARQ-ACK information with respect to the downlink data from the UE,
   wherein the downlink data includes at least one code block group,
   wherein the HARQ-ACK information indicates acknowledgement information or non-acknowledgement information with respect to each of the at least one code block group,
   wherein the HARQ-ACK information is received via the second resource in case the downlink data includes more than one code block groups, and
   wherein the HARQ-ACK information is received via the first resource instead of the second resource, in case that the HARQ-ACK information indicates that a transmission of all of the at least one code block group is successful, and
   wherein the HARQ-ACK information is transmitted via the first resource instead of the second resource, in case that the HARQ-ACK information indicates that the transmission of all of the at least one code block group fails.

10. The base station as claimed in claim 9, wherein one or more code blocks are interleaved in a code block group to which the one or more code blocks belong.

11. The base station as claimed in claim 9, wherein the HARQ-ACK information received via the first resource includes one bit and the HARQ-ACK information received via the second resource includes more than one bit.

12. The base station as claimed in claim 9, wherein at least one code block included in the at least one code block group is mapped to an integer number of symbols.

13. A user equipment (UE) that transmits hybrid automatic repeat request-acknowledgement (HARQ_ACK) information in a wireless communication system, the UE comprising:
   a transceiver; and
   a controller connected to the transceiver, and configured to perform control so as to receive, from a base station, configuration information indicating a first resource and a second resource by a higher layer signaling, to receive downlink control information for scheduling downlink data from the base station, to receive the downlink data, and to transmit HARQ-ACK information with respect to the downlink data to the base station,
   wherein the downlink data includes at least one code block group,
   wherein the HARQ-ACK information indicates acknowledgement information or non-acknowledgement information with respect to each of the at least one code block group,
   wherein the HARQ-ACK information is transmitted via the second resource in case the downlink data includes more than one code block groups, and
   wherein the HARQ-ACK information is transmitted via the first resource instead of the second resource, in case that the HARQ-ACK information indicates that a transmission of all of the at least one code block group is successful, and
   wherein the HARQ-ACK information is transmitted via the first resource instead of the second resource, in case that the HARQ-ACK information indicates that the transmission of all of the at least one code block group fails.

14. The UE as claimed in claim 13, wherein one or more code blocks are interleaved in a code block group to which the one or more code blocks belong.

15. The UE as claimed in claim 13, wherein each of at least one code block included in the at least one code block group is mapped to an integer number of symbols.

* * * * *